(12) United States Patent
Martinez et al.

(10) Patent No.: US 8,255,485 B2
(45) Date of Patent: *Aug. 28, 2012

(54) WEB SERVICES-BASED COMPUTING RESOURCE LIFECYCLE MANAGEMENT

(75) Inventors: Frank Martinez, La Canada, CA (US); Paul Kevin Toth, Daly City, CA (US); Parand Tony Darugar, San Diego, CA (US)

(73) Assignee: Blue Titan Software, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/962,496

(22) Filed: Dec. 7, 2010

(65) Prior Publication Data

US 2011/0196940 A1    Aug. 11, 2011

Related U.S. Application Data

(63) Continuation of application No. 10/387,197, filed on Mar. 12, 2003, now Pat. No. 7,853,643, which is a continuation-in-part of application No. 09/990,722, filed on Nov. 21, 2001, now Pat. No. 7,296,061.

(51) Int. Cl.
*G06F 15/16* (2006.01)

(52) U.S. Cl. .......................................... 709/217; 709/238

(58) Field of Classification Search .................. 709/203, 709/223, 217, 238, 227
See application file for complete search history.

(56) References Cited

U.S. PATENT DOCUMENTS

| | | | |
|---|---|---|---|
| 5,428,606 A | 6/1995 | Moskowitz | |
| 5,491,692 A | 2/1996 | Gunner et al. | |
| 5,539,735 A | 7/1996 | Moskowitz | |
| 5,864,854 A | 1/1999 | Boyle | |
| 5,951,694 A | 9/1999 | Choquier et al. | |
| 6,041,049 A | 3/2000 | Brady | |
| 6,112,248 A | 8/2000 | Maciel et al. | |
| 6,154,781 A | 11/2000 | Bolam et al. | |
| 6,202,093 B1 | 3/2001 | Bolam et al. | |
| 6,212,550 B1 | 4/2001 | Segur | |
| 6,215,765 B1 | 4/2001 | McAllister et al. | |
| 6,298,455 B1 | 10/2001 | Knapman et al. | |
| 6,308,216 B1 | 10/2001 | Goldszmidt et al. | |
| 6,334,151 B1 | 12/2001 | Bolam et al. | |
| 6,408,282 B1 | 6/2002 | Buist | |
| 6,466,949 B2 | 10/2002 | Yang et al. | |
| 6,510,429 B1 | 1/2003 | Todd | |
| 6,643,682 B1 | 11/2003 | Todd et al. | |
| 6,778,531 B1 * | 8/2004 | Kodialam et al. ............. | 370/390 |

(Continued)

FOREIGN PATENT DOCUMENTS

GB    2345162 A    6/2000

*Primary Examiner* — Barbara Burgess
(74) *Attorney, Agent, or Firm* — Baker Botts L.L.P.

(57) ABSTRACT

Methods, apparatuses and systems facilitating life-cycle management and utilization of network resources. In one embodiment, instancing, virtualization and dynamic provisioning functionality facilitating management and utilization of web services is provided. The instancing functionality supports a web services network platform allowing for registration and use of multiple instances or versions of a given web service or other network-accessible computing resource. In one embodiment, the present invention combines the virtualization and dynamic provisioning functionality to facilitate the development of client application code in routed web services network architectures. In one embodiment, a set of management functions that may be applied to management of computing resources in any IP-based network.

20 Claims, 11 Drawing Sheets

U.S. PATENT DOCUMENTS

| | | |
|---|---|---|
| 6,792,605 B1 | 9/2004 | Roberts et al. |
| 6,810,427 B1 * | 10/2004 | Cain et al. .................... 709/238 |
| 6,823,369 B2 | 11/2004 | Leach et al. |
| 6,898,633 B1 * | 5/2005 | Lyndersay et al. ............ 709/226 |
| 6,915,519 B2 | 7/2005 | Williamson et al. |
| 6,947,992 B1 | 9/2005 | Shachor |
| 7,089,307 B2 | 8/2006 | Zintel et al. |
| 7,103,680 B1 | 9/2006 | Holdsworth et al. |
| 7,143,190 B2 | 11/2006 | Christensen et al. |
| 7,162,524 B2 | 1/2007 | Astley et al. |
| 7,177,859 B2 | 2/2007 | Pather et al. |
| 2001/0049721 A1 | 12/2001 | Blair et al. |
| 2001/0054020 A1 * | 12/2001 | Barth et al. ..................... 705/37 |
| 2001/0056416 A1 | 12/2001 | Garcia-Luna-Aceves et al. |
| 2002/0004846 A1 | 1/2002 | Garcia-Luna-Aceves et al. |
| 2002/0026630 A1 | 2/2002 | Schmidt et al. |
| 2002/0069279 A1 | 6/2002 | Romero et al. |
| 2002/0169889 A1 * | 11/2002 | Yang et al. .................... 709/244 |
| 2002/0178254 A1 * | 11/2002 | Brittenham et al. .......... 709/224 |
| 2003/0041094 A1 * | 2/2003 | Lara et al. ..................... 709/201 |
| 2003/0120593 A1 | 6/2003 | Bansal et al. |
| 2003/0135556 A1 | 7/2003 | Holdsworth |
| 2004/0002958 A1 | 1/2004 | Seshadri et al. |
| 2004/0019645 A1 | 1/2004 | Goodman et al. |
| 2004/0064821 A1 | 4/2004 | Rousselle |
| 2004/0076149 A1 | 4/2004 | Parent et al. |
| 2004/0122906 A1 | 6/2004 | Goodman et al. |
| 2004/0139166 A1 | 7/2004 | Collison |
| 2005/0149633 A1 | 7/2005 | Natarajan et al. |
| 2005/0267896 A1 | 12/2005 | Goodman et al. |
| 2005/0273499 A1 | 12/2005 | Goodman et al. |
| 2006/0036679 A1 | 2/2006 | Goodman et al. |

\* cited by examiner

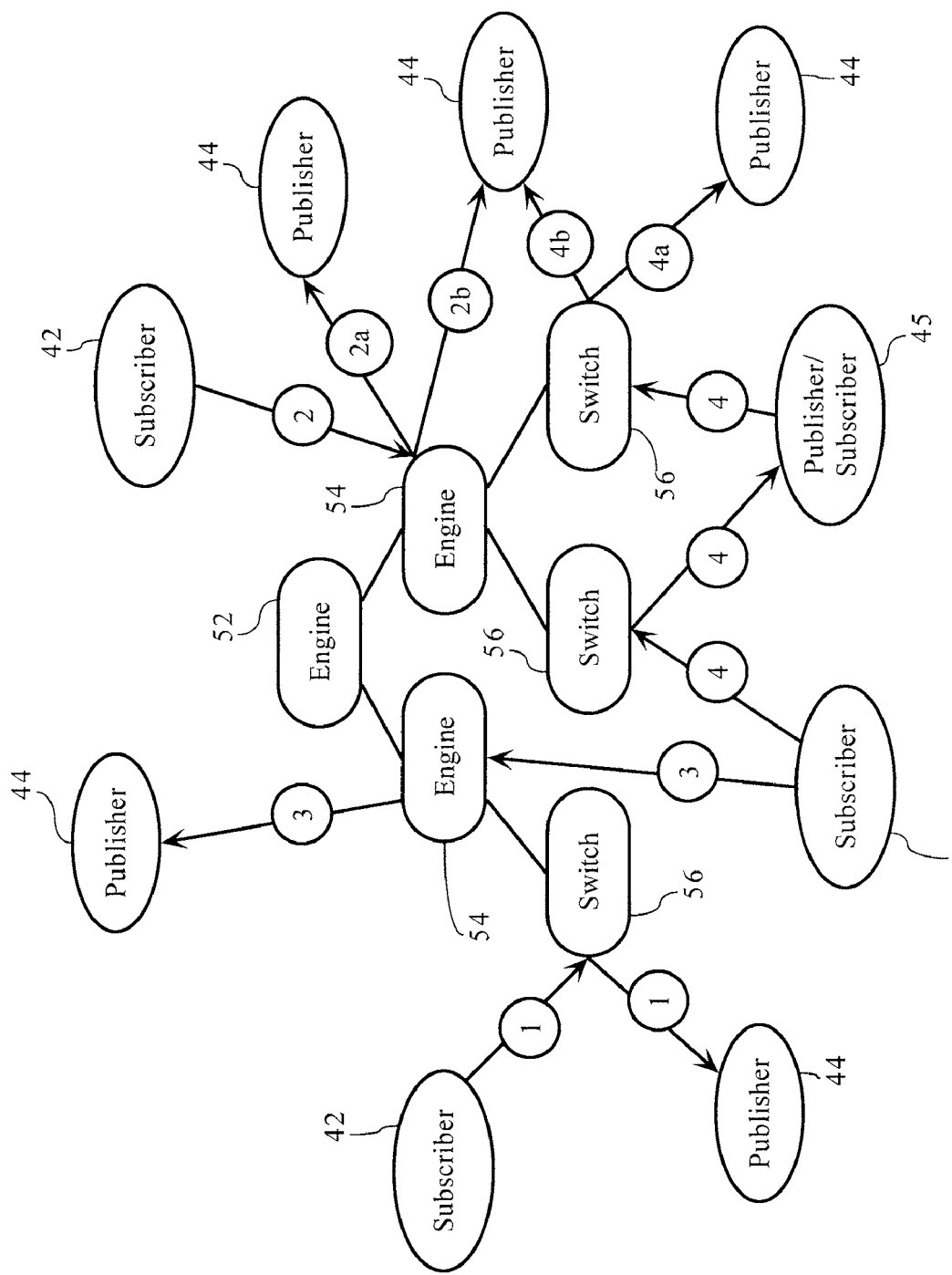
Fig._7A

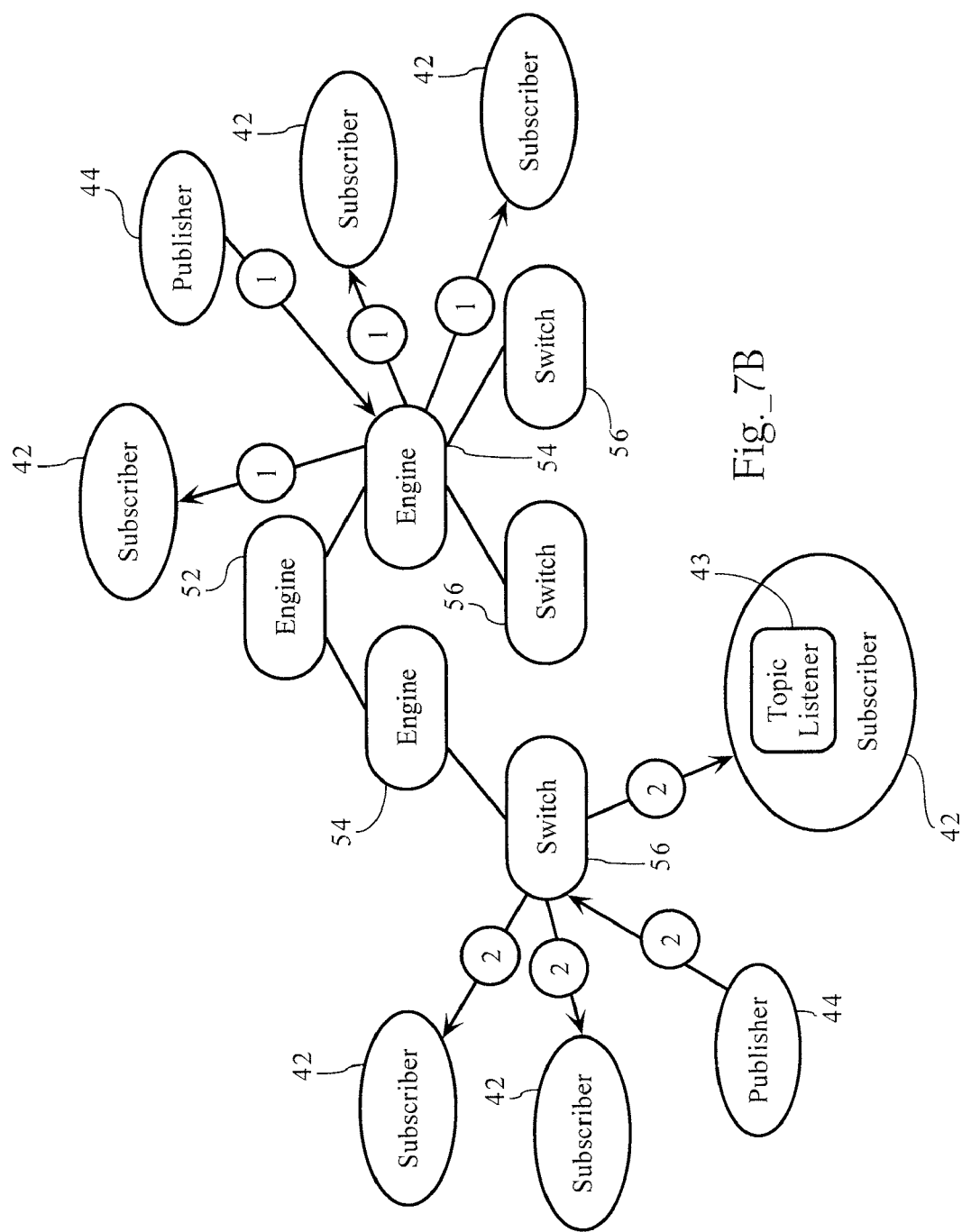
Fig._7B

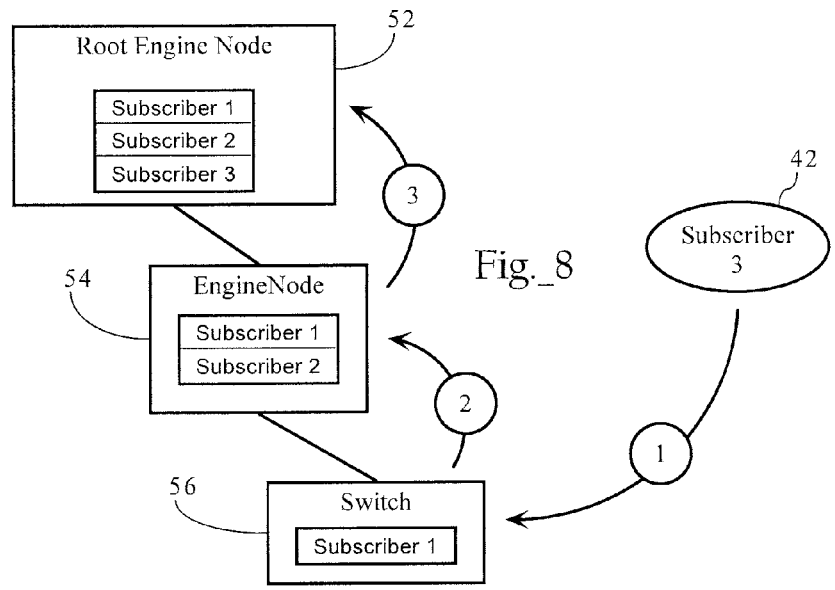
Fig._8
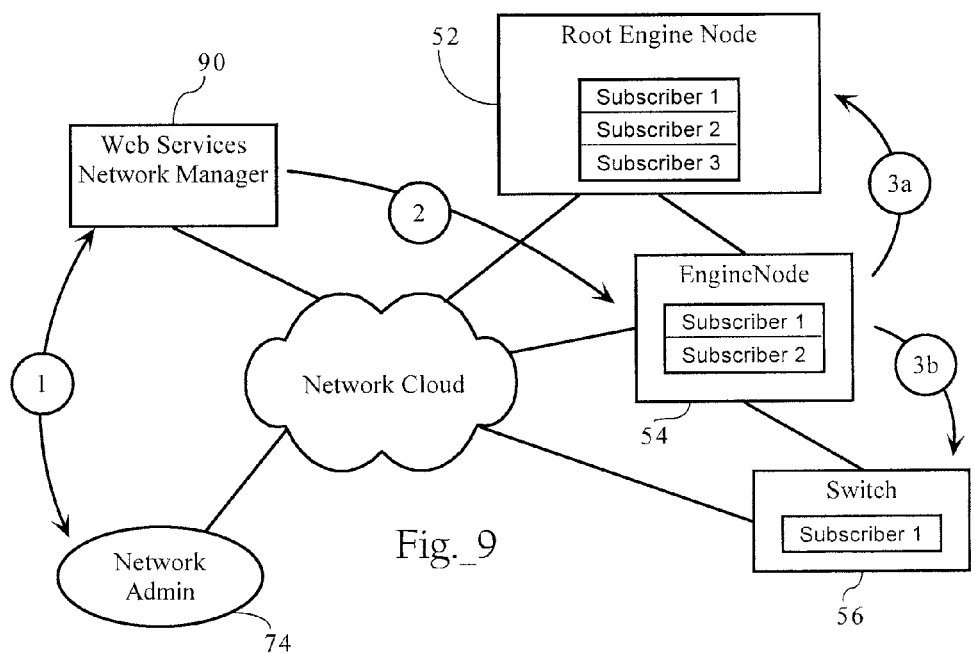
Fig._9

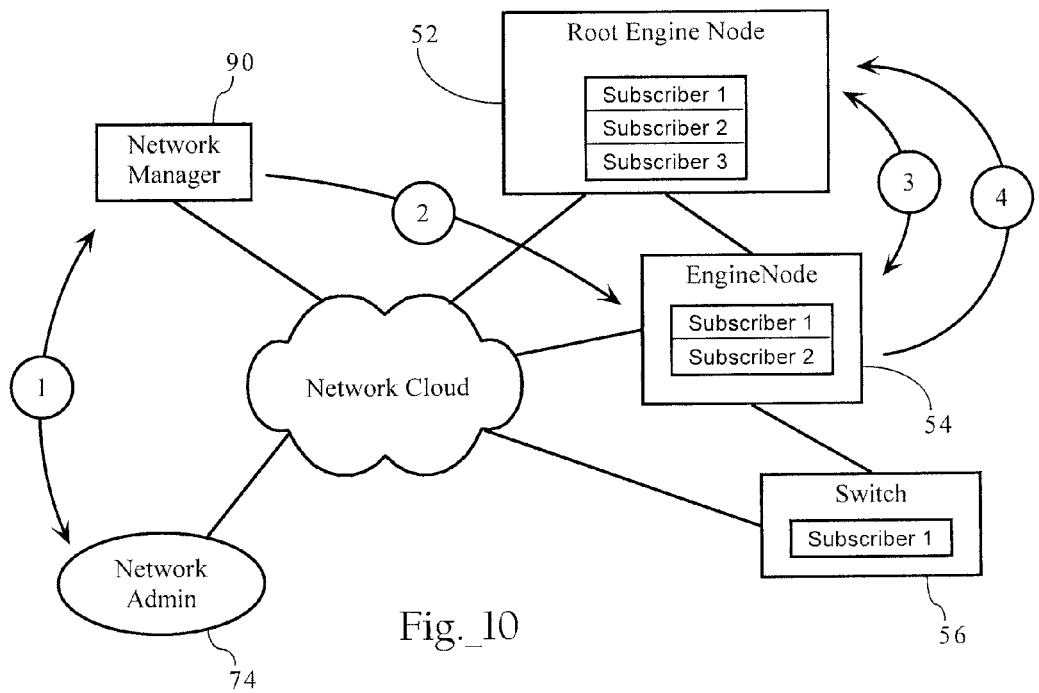
Fig._10
| Routing Entity | Local Routing Table | Child Node A | Child Node B |
|---|---|---|---|
| Subscriber X | 12/10/02; 17:26 | 12/12/02; 11:16 | 10/12/02; 10:53 |
| Subscriber Y | 12/19/02; 15:05 | 12/19/02; 15:51 | 12/20/02; 13:15 |
| Publisher X | 12/5/02; 13:27 | 1/3/03; 16:14 | 1/4/03; 16:15 |
| Service X | 12/1/02; 16:21 | 12/5/02; 16:22 | 12/4/02; 18:16 |
| Action X | 1/6/03; 18:45 | 1/5/03; 14:17 | 1/7/03; 19:21 |
| Topic 1 | 12/2/02; 13:54 | 12/4/02; 15:31 | 12/3/02; 18:54 |
| End-User X | 12/21/02; 15:11 | 12/22/02; 15:16 | 12/21/02; 19:16 |
Fig._12

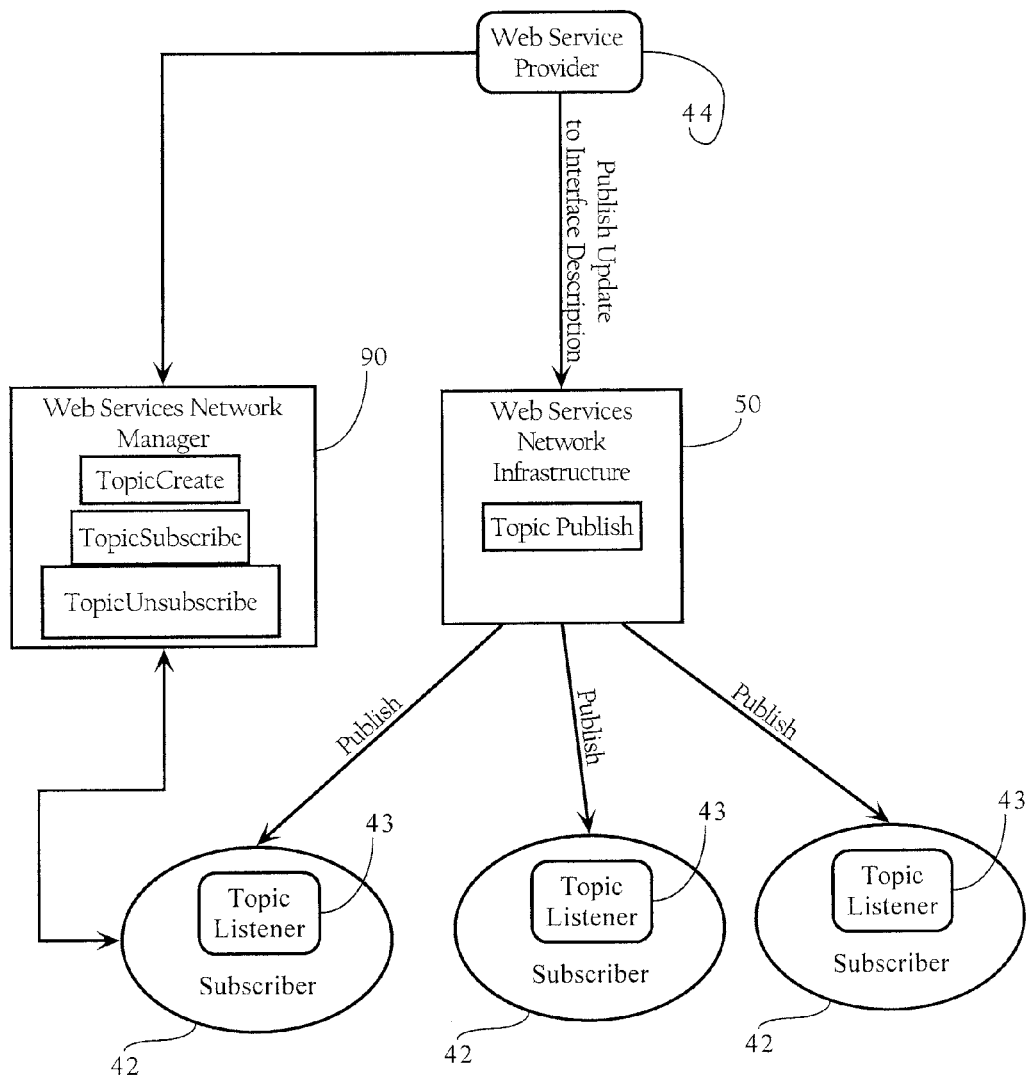
Fig._11

WEB SERVICES-BASED COMPUTING RESOURCE LIFECYCLE MANAGEMENT

CROSS-REFERENCE TO RELATED APPLICATIONS

The present application is a continuation of U.S. patent application Ser. No. 10/387,197, filed Mar. 12, 2003 now U.S. Pat. No. 7,853,643 entitled Web Services-Based Computing Resource Lifecycle Management, which is a continuation-in-part of U.S. patent application Ser. No. 09/990,722 filed Nov. 21, 2001, entitled Distributed Web Services Network Architecture, now U.S. Pat. No. 7,296,061.

This application also makes reference to the following commonly owned U.S. patent applications, which are incorporated herein by reference in their entirety for all purposes:

U.S. patent application Ser. No. 10/350,644 in the name of Parand Tony Darugar, Frank Martinez, and Paul Toth, entitled "Network Publish/Subscribe System Incorporating Web Services Network Routing Architecture;" and U.S. patent application Ser. No. 10/350,645 in the name of Parand Tony Darugar, Frank Martinez, and Paul Toth, entitled "Network Publish/Subscribe System Incorporating Web Services Network Functionality."

FIELD OF THE INVENTION

The present invention relates to web services networks and, more particularly, to method, apparatuses and systems directed to virtualization, instancing and dynamic provisioning of web or application services. Furthermore, the present invention, in one embodiment, provides of a set of management functions that may be applied to Web services-based management of network addressable computing resources in any IP-based network.

BACKGROUND OF THE INVENTION

Web services networks are rapidly evolving technology architectures allowing applications to tap into a variety of services in an extremely efficient and cost effective manner. Web services enable cost-effective and efficient collaboration among entities within an enterprise or across enterprises. Web or application services are network addressable computing resources that exchange data and execute processes. Essentially, Web services are applications exposed as services over a computer network and employed by other applications using Internet standard technologies, such as XML, SOAP, WSDL, etc. Accordingly, Web applications can be quickly and efficiently assembled with services available within an enterprise LAN or external services available over open computer networks, such as the Internet.

A Web services network can be deployed across an enterprise LAN or across a Wide Area Network, such as the Internet. A typical Web services network includes at least one network services broker that is operative to receive a service request and route the service request to the appropriate resource. A broker is a specially configured server or cluster of servers acting as an intermediary for Web service requests and responses. As Web services network usage increases, however, the broker can become a bottleneck. To ease this bottleneck, the prior art solution is simply to add additional processing power to the broker (e.g., additional servers), which is costly, inefficient, and fails to leverage the enterprise's investments in its existing network infrastructure. Moreover, the centralized nature of the broker creates reliability concerns in that failure of the broker disables the applications accessing services through it. Accordingly, U.S. application Ser. No. 09/990,722 discloses a distributed Web services network architecture that, among other things, alleviates the bottleneck and point-of-failure concerns discussed above.

The Interface Definition Language (IDL) was introduced in the early 1990s by a consortium of large corporations known as the Object Management Group (OMG). The purpose of IDL was to provide a standard platform- and language-independent grammar by which the interfaces used to connect software components are described. IDL became one of the cornerstones of CORBA technology, and variants such as MIDL (developed by Microsoft® Corporation) have been used to describe the interfaces employed by a number of other component architectures. The emergence of Web services spurred the creation of a conceptually and syntactically similar interface description language, Web Services Description Language (WSDL), intended to address the unique issues associated with Web-based protocols.

WSDL has been widely adopted and is currently the de facto industry-wide standard for Web service interface definition. All commercial Web service toolkits support WSDL consumption and/or generation at least to some extent. Current Web services functionality includes the ability to do one or more of the following tasks with respect to WSDL:

Consume a WSDL document, generating a Web service request template or a source code skeleton to be used for generating a request and consuming a response.

Consume a WSDL document, generating a source code skeleton for responding to Web service requests defined in that document.

Generate a WSDL document, based on the low-level interfaces implicit in a source code module.

Place WSDL in a repository, sometimes based on Universal Description, Discovery, and Integration (UDDI), and provide access to that repository to interested parties.

WSDL documents are static—that is, once generated or stored in a registry they are treated essentially like any other block of text, where all information presented in the WSDL document is assumed to be immutable. Accordingly, changes to the underlying Web service associated with a WSDL document requires corresponding changes to the WSDL document and any applications that consume this Web service. For example, consider the situation where a materials company has located a Web service at www.chemco.com/ws/aluminum oxides. The endpoint is duly noted in the service's WSDL document, which is in turn imported by a number of client applications. This arrangement initially works as intended; however, several months after the service is introduced, another enterprise "Acquiring Chemical Co." acquires the business unit offering the web service. Acquiring Chemical Co. is naturally averse to using the "Chemco" name in its URLs, and wishes to deploy the service onto www.acquiringchemcoIT/services/materials:7001. This presents a serious problem in that the client applications using the service have acquired the WSDL containing the endpoint location as a static document, and will continue to use the originally specified endpoint unless additional measures are undertaken.

In light of the foregoing, a need in the art exists for methods, apparatuses and systems that allow Web service application to dynamically adapt to changes in Web services. In addition, a need in the art exists for methods, apparatuses and systems facilitating the virtualization of web services. A need further exists in the art for methods, apparatuses and systems facilitating the dynamic provisioning of web services. A need also exists in the art for methods, apparatuses and systems allowing for the instancing of web services. Embodiments of the present invention substantially fulfill these needs.

SUMMARY OF THE INVENTION

The present invention provides methods, apparatuses and systems facilitating life-cycle management and utilization of network resources, such as web or other application services. In one embodiment, the present invention provides instancing, virtualization and dynamic provisioning functionality facilitating management and utilization of web services. The instancing functionality according to embodiments of the present invention supports a web services network platform allowing for registration and use of multiple instances or versions of a given web service or other network-accessible computing resource. The virtualization functionality according to embodiments of the present invention allows consuming client applications to refer to web services, or other network-accessible computing resources, and their corresponding operations by name allowing, for example, changes to the underlying web service implementation, without necessitating changes to the consuming client application. The dynamic provisioning functionality according to embodiments of the present invention eases the development of client application code to consume a web service, or other network-accessible computing resource by modifying interface descriptions in a manner that facilitates code development for use in connection with a given web services network. In one embodiment, the dynamic provisioning functionality provides interface descriptions modified according to the current state of the web services network. In one embodiment, the present invention combines the virtualization and dynamic provisioning functionality to facilitate the development of client application code in routed web services network architectures. Furthermore, the present invention, in one embodiment, provides of a set of management functions that may be applied to management of computing resources in any IP-based network in the same manner the embodiments, described below, provide for management of Web service networks.

DESCRIPTION OF THE DRAWINGS

FIG. 7A is a functional block diagram showing various scenarios associated with routing of service operation requests.

FIG. 7B is a functional block diagram showing various scenarios associated with routing of topic messages.

FIG. 8 is a functional block diagram illustrating the process flow associated with a routing entry request.

FIG. 9 is a functional block diagram setting forth an exemplary process flow associated with routing table updates.

FIG. 10 is a functional block diagram setting forth a process flow associated with routing table maintenance.

FIG. 11 is a functional block diagram illustrating application of a publish/subscribe system configured to distribute updates to interface descriptions associated with web services to consuming applications.

FIG. 12 is a table illustrating a routing matrix according to an embodiment of the present invention.

DESCRIPTION OF PREFERRED EMBODIMENT(S)

A. Operating Environment

Figure 1:
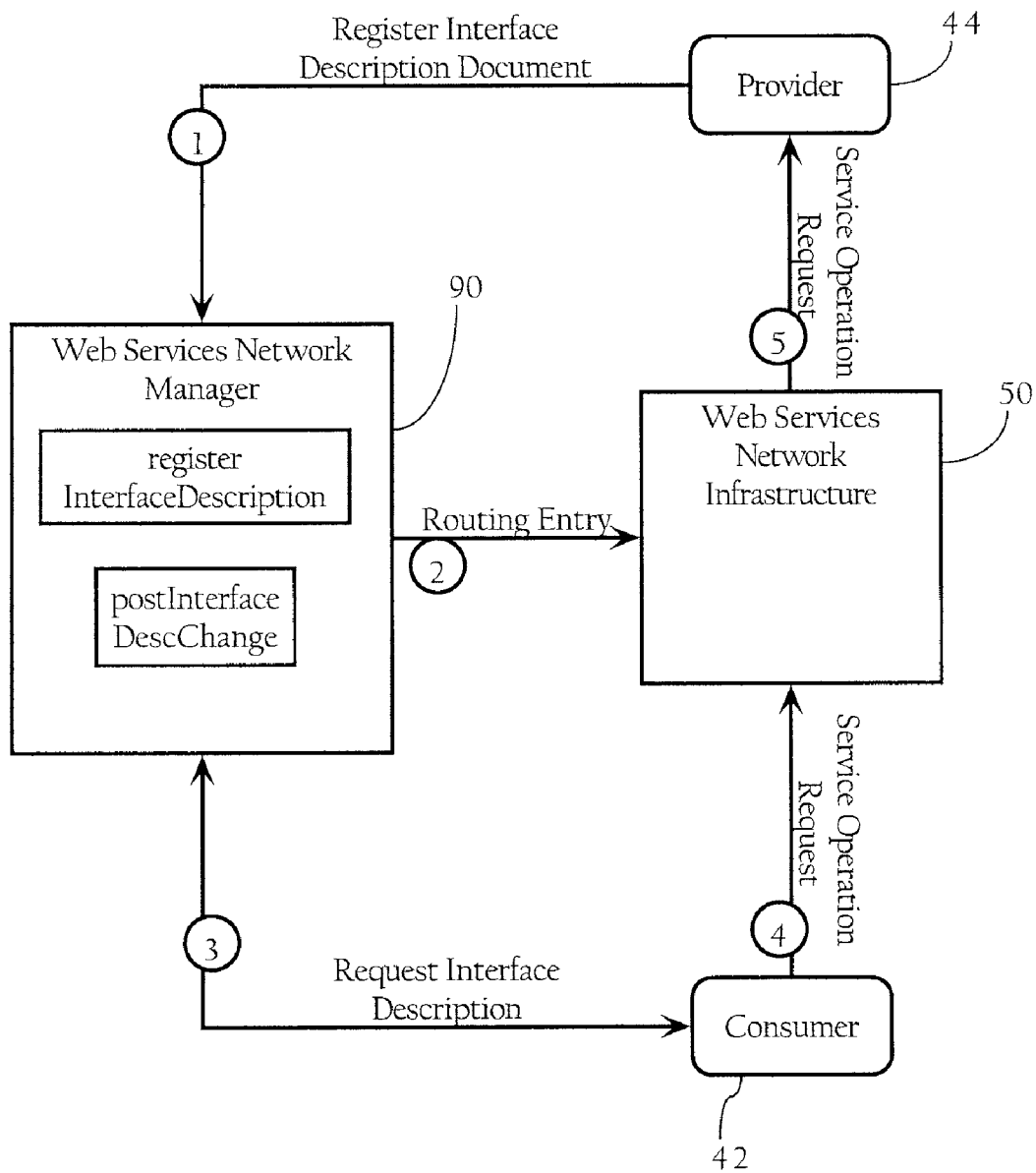
FIG. 1 is a functional block diagram illustrating the functionality and basic operating elements associated with a web services network environment according to an embodiment of the present invention.

FIG. 1 is a functional block diagram illustrating the functionality and basic operating elements associated with the dynamic web services interface description and provisioning system according to an embodiment of the present invention. Web services provider or publisher 44 is an entity that hosts a web- or other network-based application accessible to consuming applications using predefined interfaces and protocols. Web services consumer or subscriber 42 is an entity associated with an application that consumes one or more web services, as discussed more fully below. Web services network infrastructure 50 refers generally to a variety of web services network architectures that support the routing of service operation requests and responses between web services consumers 42 and web services providers 44. Web services network manager 90 is a management platform facilitating management and configuration tasks associated with web services network infrastructure 50, such as registration and discovery of web services.

Web services network manager 90 supports the virtualization, dynamic provisioning and instancing functionality described herein. As discussed in more detail below, web services network manager 90 allows web services providers 44 to register web services, and allows web service consumers 42 to discover web services registered on the platform. As FIG. 1 illustrates, registration of web services, in one embodiment, entails the submission of an interface description to web services network manager 90. As discussed more fully below, web services network manager 90 is further operative to adjust the configuration of web services network infrastructure 50 to allow for the routing of service operation requests and responses associated with a service registered with the web services network manager 90.

Web services network infrastructure 50 is operative to route service operation requests and responses between web services consumers and providers. The operations associated with a given web service are typically described in an interface description, and invoked by consuming applications, by direct reference to the endpoint locations (expressed as URIs or IP addresses) and other binding information (e.g., protocols, formats, etc.) associated with each operation. As discussed more fully below, Web services network infrastructure 50 associates a unique identifier to each service and its corresponding operations to the endpoint locations and other binding information associated with each operation or service. Specifically, as disclosed in U.S. application Ser. No. 09/990,722, a consuming application invokes an operation by composing a request including an operation identifier and a service identifier and transmitting the request to a routing node within web services network infrastructure 50. Web services network infrastructure 50 resolves the service and operation identifiers to an endpoint location (and possibly other binding information) associated with the service and uses this information to route the request to that endpoint.

The embodiment set forth in FIG. 1 is for purposes of illustrating the functionality associated with the present invention. As one skilled in the art will recognize, the present invention and the functionality set forth herein can be integrated into a variety of Web services network architectures. For example, the present invention can operate in connection with web services network brokers and gateways that are extended to associate service and operation identifiers in request headers into appropriate endpoint locations and other binding information. The present invention can also operate in connection with a distributed web services network architecture, such as that disclosed in U.S. application Ser. No. 09/990,722. The present invention can also be applied to a peer-to-peer web services network architecture, where the proxies or stubs may be extended to associate service and operation identifiers in request headers into appropriate endpoints and other binding information.

B. Virtualization, Provisioning and Instancing of Web Services

As discussed in more detail below, web services network manager 90 in connection with web services network infrastructure 50 creates a development and execution environment allowing for virtualization of web or application services, dynamic provisioning of web-based applications, and instancing of web or application services. The functionality described herein may also be applied to other types of IP-based networks beyond those dedicated largely to provisioning and consumption of Web services.

B.1. Virtualization

Presently, most Web service-consuming applications are configured with statically defined information contained in an interface description, such as a WSDL document, corresponding to a given web or application service. While dedicated primarily to virtualization of Web services, the preferred embodiment may configured to consume other types of interface descriptions providing metadata describing the interface of any network-accessible computing resource. Such interface descriptions include, among other things, a binding that sets forth an endpoint location and the protocols (e.g., SOAP, HTTP, etc.) to be used in connection with composing and transmitting requests to the web service. Accordingly, the consuming application and, consequently, requests composed by it, access a given web service, or other network-accessible computing resource, using the statically-defined binding information, such as the location of the endpoint associated with the service, and the protocols according to which the message should be formatted. In this manner, the definition and use of a given web service is inextricably intertwined with a particular instance (including implementation details) of that service. For example, a consuming application configured according to the current state of the art might dispatch a message to a Web service that returns stock quote information residing on a server having an IP address of 196.32.18.1:80. According to the current state of the art, the destination address of the request is the IP address associated with the server (here, 196.32.18.1:80) and an identification of a requested operation (e.g., "GetStockQuote").

Embodiments of the present invention allow for the virtualization of web services and other network-accessible computing resources. That is, users and consuming applications need not know the actual binding information or other details associated with a given web service's implementation because they can refer to that service, or other network-accessible computing resource, and its operations, or other aspects, by name or other identifier. For example, using virtualization, a consuming application would instead dispatch a message identifying the Web service named "StockQuote" and a supported operation "GetTradePrice" to a routing node associated with the web services network infrastructure 50. The web services network infrastructure 50 itself resolves the actual endpoint and, potentially, other binding information, according to which the message is routed. As one skilled in the art will recognize, the virtualization provided by the present invention allows for changes to the underlying web services (e.g., endpoint location and other binding information) without necessitating corresponding changes to the consuming application.

FIG. 1 illustrates a process flow, according to an embodiment of the present invention, associated with the registration and consumption of a web or application service. A web service provider 44 creates a web service and registers that service with web services network manager 90, providing an interface description for that service (FIG. 1, # 1). Web services network manager 90, in one embodiment, assigns a unique identifier to the service, and processes the interface description to identify the operations associated with the service and to assign unique identifiers to the identified operations. In one embodiment, the unique identifiers comprise the service and operation names contained in the interface description provided by the web service provider 44. In one embodiment, web services network manager 90 configures the web services network infrastructure 50 to include service and operation routing entity information required to route service operation requests and responses associated with the service between consumers 42 and providers 44 (# 2). As discussed in more detail below, the web services network infrastructure 50 includes a web services network routing architecture wherein services and operations are represented as routing entities. Accordingly, a given service and operation name corresponds to an operation and is persisted in a database that also includes information allowing for the routing of requests to the web service provider 44, such as the URI or IP address of the endpoint. For example, the information may include a pointer to the interface description associated with the web service to facilitate retrieval of the binding information associated with the web service.

Web services network manager 90 persists the interface description in a web services registry accessible to web service consumers 42 over a computer network. A web service consumer 42, during the process of discovering a web service in the registry, requests information on a given web service (# 3). Web services network manager 90 provides the interface description in response to the request. An end-user associated with web services consumer 42, typically employing a web services application development toolkit, uses the interface description in the development of an application that consumes one or more operations associated with the service. According to the present invention, the consuming application, when invoking a given web service, is configured to compose a request that includes header information identifying the operation by service and operation identifier and to transmit the request to a routing node within the web services network infrastructure 50. In one embodiment, the operation and service identifiers are included in a URI identifying the service and operation in the request. As FIG. 1 shows, when a consuming application executes and invokes a given service operation, it transmits a service operation request to a routing node within the web services network infrastructure 50 (# 4). The web services network infrastructure 50, using the routing entities previously created (#2), looks up the routing entities identified in the URI header field of the request to identify the endpoint(s) associated with the operation, and routes the request to the endpoint (#5). In one embodiment, the web services network infrastructure 50 opens a connection to the web service provider 44, using the endpoint location and other binding information in the interface description, and transmits the request. As to synchronous requests, the connection remains open until web services network infrastructure 50 receives a response, which is then forwarded to the web service consumer 42.

In one embodiment, once a web service is registered, web services network manager 90 allows the web service provider to establish access rights defining the subscribers or other users authorized to use the service. In one embodiment, a user associated with the web service provider logs into web services network manager and accesses a configuration page. The user then provides a list of organizations and/or end-users allowed to access the registered web service. The web services network manager 90 configures an access control list, or modifies an existing access control list, for the service and updates the routing information maintained by the web services network infrastructure to include the access control list. Thereafter, only those organizations on the access control list may subscribe or otherwise consume the service. At this point, it becomes possible for those organizations granted access to a service to access that service. A consuming application composes a request to use a service, including the headers required by the web service network infrastructure 50. These headers refer to the target service and operation by name, rather than by endpoint location, and include an identification of the consuming application, typically by organization name or other identifier. The consuming application dispatches the request to the web services network infrastructure 50, which checks for access rights (by scanning the organization name against the access control list) and transmits the request to an appropriate endpoint.

In this manner, load balancing, fail over, or other arbitration among multiple endpoints corresponding to a given web service can be performed within the context of web services network infrastructure 50, rather than the consuming application. For example, as the following demonstrates, use of the virtualization functionality associated with the present invention may have a significant impact on the development of consuming application code. For didactic purposes, consider a block of legacy code intended to invoke a web service in an environment requiring load balancing and fail over:

```
//Get the Interface Description
WsdlFile wsdl = GetWSDLDocs("diffyq.wsdl");
//Identify Endpoint Location(s)
EndpointList e = GetEndpoint(wsdl);
//Obtain Application Configuration Information
//and poll an external source to potentially identify alternative
//endpoint locations
AppConfig config = GetAppConfig( );
EndpointList ex = config.GetAuxEndpointsForService("diffyq");
e.appendList(ex);
//Initialize web services invocation layer
Invoker in = new Invoker( );
while (! in.success)
{
    Endpoint end = GetOptimalEndpoint(ex);
    result = in.InvokeAt(end, action);
}
prompt("solution was " + result.text);
```

The example provided above contrasts sharply with how client-side code can be written in a web services network environment including the virtualization functionality associated with the present invention. For example, the following code can be used to invoke the same web service:

```
// can use same Routing Node for all services
// identify a network address of a routing node
// within the web services network infrastructure
Switch sw = GetSwitchLocation( );
Invoker in = new Invoker;
Result = in.InvokeAt(sw, action);
prompt("solution was " + result.text);
```

B.2. Provisioning

Embodiments of the present invention allow for dynamic provisioning of web-based applications to facilitate the development of application code that operates in a web services network environment, or other IP-based network environment. As discussed below, the provisioning functionality, in one embodiment, leverages the virtualization functionality discussed above. FIG. 1 also illustrates the process flow, according to an embodiment of the present invention, associated with the registration, dynamic provisioning, and consumption of a web or application service. As discussed above, web service provider 44 creates a web service, or other network-accessible computing resource, and registers that service, or other network-accessible resource, with web services network manager 90, providing an interface description, or other applicable metadata for that service, or other network-accessible computing resource (FIG. 1, # 1). Web services network manager 90, in one embodiment, assigns a unique identifier to the service, or other network-accessible computing resource, and processes the interface description, other applicable metadata, to identify the operations associated with the service and to assign unique identifiers to the identified operations. As discussed above, in one embodiment, the unique identifiers comprise the service and operation names in the interface description provided by the web service provider 44. In one embodiment, web services network manager 90 configures the web services network infrastructure 50 to include service and operation routing entity information required to route service operation requests and responses associated with the service between consumers 42 and providers 44 (# 2). To develop an application that consumes a web service, a web services consumer 42 requests the interface description associated with a desired web service to allow for development of a consuming application that makes requests to the corresponding web service in an appropriate format (# 3).

According to the approach taken by embodiments of the present invention, the interface description corresponding to a given web service is treated as a de facto template. That is, when a web services consumer requests an interface description associated with a web service, web services network manager 90 dynamically generates a modified interface description, altering mutable elements (and potentially adding additional elements) of the interface description (e.g., the URL associated with the endpoint location) with appropriate values to reflect the current state of the web services network infrastructure 50, and transmits the dynamically generated interface description to the requesting web services consumer 42. In one embodiment, web services network manager 90 alters the interface description to facilitate development of application code that operates in a web services network environment supporting the virtualization functionality discussed above. For example, and as discussed more fully below, web services network manager 90 replaces endpoint locations associated with operations in the interface description with a URL identifying a routing node within the web services network infrastructure 50. As discussed above, a separate URI, in one embodiment, identifies each corresponding operation by service identifier and operation identifier pairs. Accordingly, instead of developing application code that includes statically-defined binding elements, such as endpoint location, of the interface description associated with a web service, a consuming application developer creates application code that invokes a given web service by transmitting requests to an identified routing node, passing it a service and operation identifier. When the consuming application executes and invokes a web service, the consuming application transmits a service operation request to the routing node of the web services network infrastructure 50, which looks up the binding information associated with the identified service and operation, and uses this information to create a properly formatted request and routes the service operation request to the appropriate endpoint location. Many changes to the underlying web service therefore require corresponding changes to the routing or directory information maintained by the web services network infrastructure 50. However, such changes do not require reconfiguration of the consuming web application. Moreover, as discussed above, load balancing and fail over functionality can be implemented within the context of the web services network infrastructure 50, as opposed to the consuming client application.

In addition, as with virtualization, the dynamic provisioning functionality also simplifies the client application code.

```
WsdlFile wsdl = GetWSDLDocs("diffyq.wsdl")
sw = GetEndpoint(wsdl);
Invoker in = new Invoker;
Result = in.InvokeAt(sw, action);
prompt("solution was " + result.text);
```

In this didactic example, the endpoint location of the service was replaced with the address of a routing node within the web services network infrastructure 50. Accordingly, the address, sw, to which the request is sent is determined by retrieving the interface description provided by web services network manager 90 which replaced the actual endpoint location associated with the web service with the address of a web services network routing node. As one skilled in the art will recognize, the routing node location may also be included directly into the application source code.

B.2.a. Dynamic, Mutable Elements of an Interface Description

The following is a didactic example of a WSDL document describing the interface associated with a hypothetical web service named "StockQuote", which may be submitted to web services network manager 90 during registration of that web service.

```
<?xml version="1.0"?>
<definitions name="StockQuote"
    targetNamespace="http://example.com/stockquote.wsdl"
    xmlns:tns="http://example.com/stockquote.wsdl"
    xmlns:xsd="http://www.w3.org/2000/10/XMLSchema"
    xmlns:xsd1="http://example.com/stockquote.xsd"
    xmlns:soap="http://schemas.xmlsoap.org/wsdl/soap/"
    xmlns="http://schemas.xmlsoap.org/wsdl/">
```

-continued

```
<message name="GetTradePriceInput">
    <part name="tickerSymbol" element="xsd:string"/>
    <part name="time" element="xsd:timeInstant"/>
</message>
<message name="GetTradePriceOutput">
    <part name="result" type="xsd:float"/>
</message>
<portType name="StockQuotePortType">
    <operation name="GetTradePrice">
        <input message="tns:GetTradePriceInput"/>
        <output message="tns:GetTradePriceOutput"/>
    </operation>
</portType>
<binding name="StockQuoteSoapBinding"
type="tns:StockQuotePortType">
    <soap:binding style="rpc"
    transport="http://schemas.xmlsoap.org/soap/http"/>
    <operation name="GetTradePrice">
        <soap:operation
        soapAction="http://example.com/GetTradePrice"/>
        <input>
            <soap:body use="encoded"
            namespace="http://example.com/stockquote"
                encodingStyle="http://schemas.xmlsoap.org/soap/encoding/"/>
        </input>
        <output>
            <soap:body use="encoded"
            namespace="http://example.com/stockquote"
                encodingStyle="http://schemas.xmlsoap.org/soap/encoding/"/>
        </output>
    </operation>>
</binding>
<service name="StockQuoteService">
    <documentation>My first service</documentation>
    <port name="StockQuotePort" binding="tns:StockQuoteBinding">
        <soap:address location="http://example.com/stockquote/">
    </port>
</service>
</definitions>
```

As the WSDL document provided above indicates, the StockQuote service defined in the interface description includes a single operation named "GetTradePrice." A SOAP message, according to the prior art, invoking the web service described in the interface description provided above may be:

```
POST /StockQuoteService HTTP/1.1
Host: http://example.com/stockquote/
Content-Type: text/xml; charset="utf-8"
Content-Length: nnnn
SOAPAction: http://example.com/GetTradePrice/
 <SOAP-ENV:Envelope
 xmlns:SOAP-ENV=http://schemas.xmlsoap.org/soap/envelope/
  SOAP-ENV:encodingStyle="http://schemas.xmlsoap.org/soap/
  encoding/">
    <SOAP-ENV:Body>
        <m:GetTradePrice xmlns:m="http://example.com/GetTradePrice/">
            <tickerSymbol>DIS</tickerSymbol>
        </m:GetTradePrice>
    </SOAP-ENV:Body>
</SOAP-ENV:Envelope>
```

As discussed above, web services network manager 90 treats the interface description as a de facto template, adding and/or changing various elements of the interface description as appropriate to facilitate development of application code for use in connection with web services network infrastructure and/or to reflect the current state of the web services network infrastructure. The following illustrates the changes and additions applied to the above-provided interface description by web services network manager 90, according to an embodiment of the present invention. Changes and additions are indicated in bold.

```xml
<?xml version="1.0"?>
<definitions name="StockQuote"
        targetNamespace="http://example.com/stockquote.wsdl"
        xmlns:tns="http://example.com/stockquote.wsdl"
        xmlns:xsd="http://www.w3.org/2000/10/XMLSchema"
        xmlns:xsd1="http://example.com/stockquote.xsd"
        xmlns:soap="http://schemas.xmlsoap.org/wsdl/soap/"
        xmlns="http://schemas.xmlsoap.org/wsdl/">
<types>
    <schema xmlns="http://www.w3.org/2001/XMLSchema"
targetNamespace="urn:bts-header-path">
        <element name="path" type="btns:BlueTitanHeader"/>
        <complexType name="BlueTitanHeader">
        <sequence>
            <element name="from" type="string">
            </element>
            <element name="action">
            <simpleType>
                <restriction base="string">
                    <enumeration value="urn:bts-
ServiceAction/1002/StockQuote/GetTradePrice"/>
                </restriction>
            </simpleType>
            </element>
        </sequence>
        </complexType>
    </schema>
</types>
    <message name="BlueTitanHeader">
        <part name="BlueTitanHeader" element="btns:path"/>
        <part name="path" type="btns:BlueTitanHeader"/>
    </message>
    <message name="GetTradePriceInput">
        <part name="tickerSymbol" element="xsd:string"/>
        <part name="time" element="xsd:timeInstant"/>
    </message>
    <message name="GetTradePriceOutput">
        <part name="result" type="xsd:float"/>
    </message>
    <portType name="StockQuotePortType">
        <operation name="GetTradePrice">
            <input message="tns:GetTradePriceInput"/>
            <output message="tns:GetTradePriceOutput"/>
        </operation>
    </portType>
    <binding name="StockQuoteSoapBinding"
type="tns:StockQuotePortType">
        <soap:binding style="rpc"
        transport="http://schemas.xmlsoap.org/soap/http"/>
        <operation name="GetTradePrice">
            <soap:operation
            soapAction="http://example.com/GetTradePrice"/>
            <input>
            <soap:header message="tns:BlueTitanHeader" part="path"
use="encoded"encodingStyle=
"http://schemas.xmlsoap.org/soap/encoding/"/>
                <soap:body
                use="encoded" namespace="http://example.com/stockquote"
                    encodingStyle="http://schemas.xmlsoap.org/soap/encoding/"/>
            </input>
            <output>
                <soap:body use="encoded"
                namespace="http://example.com/stockquote"
                    encodingStyle="http://schemas.xmlsoap.org/soap/encoding/"/>
            </output>
        </operation>>
    </binding>
    <service name="StockQuoteService">
        <documentation>My first service</documentation>
        <port name="StockQuotePort" binding="tns:StockQuoteBinding">
        <soap:address
        location="http://192.168.6.72:7010/Router/dispatch/"/>
        </port>
    </service>
</definitions>
```

As the example provided above illustrates, the interface description provided to the user includes additional SOAP header information to be used by the web services network infrastructure 50 for routing of the request and changes the service endpoint location to which the request is sent to a routing node having a URL, for example, of servicenetwork-.mycompanyname.com/Router. In addition, as the example provided above indicates, the web services network manager 90 is operative to scan the interface description to identify the actions associated with a service and provide an enumeration of the possible operations contained in the header of the SOAP message. In this example, only one operation "GetTradePrice" exists; however, services having more than one operation will result in a corresponding number of service-operation URIs. A SOAP request invoking the Stock-Quote web service may be formatted as follows.

```
POST /StockQuoteService HTTP/1.1
Host: http://192.168.6.72:7010/Router/dispatch/
Content-Type: text/xml; charset="utf-8"
Content-Length: nnnn
SOAPAction: http://example.com/GetTradePrice/
<SOAP-ENV:Envelope
  xmlns:SOAP-ENV=http://schemas.xmlsoap.org/soap/envelope/
  SOAP-ENV:encodingStyle="http://schemas.xmlsoap.org/soap/
  encoding/">
    <SOAP-ENV:Header>
      <path>
        <from>urn:bts-Organization/1001</from>
        <action>urn:bts-
        ServiceAction/1002/StockQuote/GetTradePrice</action>
      </path>
    </SOAP-ENV:Header>
    <SOAP-ENV:Body>
      <m:GetTradePrice xmlns:m="http://example.com/GetTradePrice/">
        <tickerSymbol>DIS</tickerSymbol>
      </m:GetTradePrice>
    </SOAP-ENV:Body>
  </SOAP-ENV:Envelope>
```

As the example provided above indicates, the consuming application dispatches the SOAP message to a routing node having a URL of servicenetwork.mycompanyname.com/Router. As discussed above, the routing node resolves the service and operation name (StockQuote and GetTradePrice, respectively) from the uniform resource name in the "action" element of the SOAP header named "BlueTitanHeader." As discussed above, the routing node, in one embodiment, may determine whether the consuming application has the appropriate access rights by scanning the value of the <from> element against the access control list associated with the named service.

Web services network manager 90 can operate to change or add a variety of element types associated with an interface description. For example, the following element types in an interface description can be changed or added:

The endpoint location specified in a SOAP or other binding. As discussed above, the endpoint location may be changed to a routing node within the web services network infrastructure 50 to facilitate development of application code operating with the web services network environment implemented by the infrastructure.

Header definitions, such as the headers identifying service and operation names allowing for routing of requests (e.g., an enumeration containing URIs for all service operations in a service).

New operations, as added to the service since it's original registration, by the service provider.

Updated documentation (WSDL provides a variety of documentation elements). Updates may be drafted either by the provider or by the network manager.

New bindings, for transport protocols supported at some point after the service's original registration. Because the web services network infrastructure 50 may be capable of handling transport mediation, bindings may be defined above and beyond those actually supported by the service provider. The routing node within the web services network infrastructure 50 would open a connection to the endpoint location of the service provider in a manner consistent with the binding information provided in the original WSDL, while the consuming application may be configured to use a different binding supported by a routing node associated with web services network infrastructure.

As discussed above, web services network manager 90 is operative to dynamically generate an interface description, altering mutable elements to reflect the current state of the web services network. For example, the endpoint location identifying a routing node (http://192:168.6.72:7010 Router/dispatch/in the example) in the web services network infrastructure 50 need not be a static value and may change in response to a configuration change to the web services network infrastructure 50. Moreover, the web services network infrastructure 50 may be extended to support additional binding types. The interface description provided to end users associated with web services consumers 42 may include information allowing for use of these additional binding types. Furthermore, Web services network manager 90, in response to a subsequent request for the same interface description, may provide an alternate routing node to achieve a crude form of load balancing among routing nodes.

In one embodiment, web service provider 44 registers changes to the underlying web service (e.g., changes to endpoint locations) with web services network manager 90. For example, web service provider 44 may provide an updated interface description to web services network manager 90. In one embodiment, web services network manager 90 is operative to compare the original version of the interface description to the revised version to identify the changes. Web services network manager 90, if any changes are detected, operates to change the configuration of web services network infrastructure 50 as to any changes, such as endpoint location, that require updates to the routing entity information associated with the service and operation names.

B.2.b. Web-Based Applications Including Dynamic Provisioning Functionality

Figure 2:
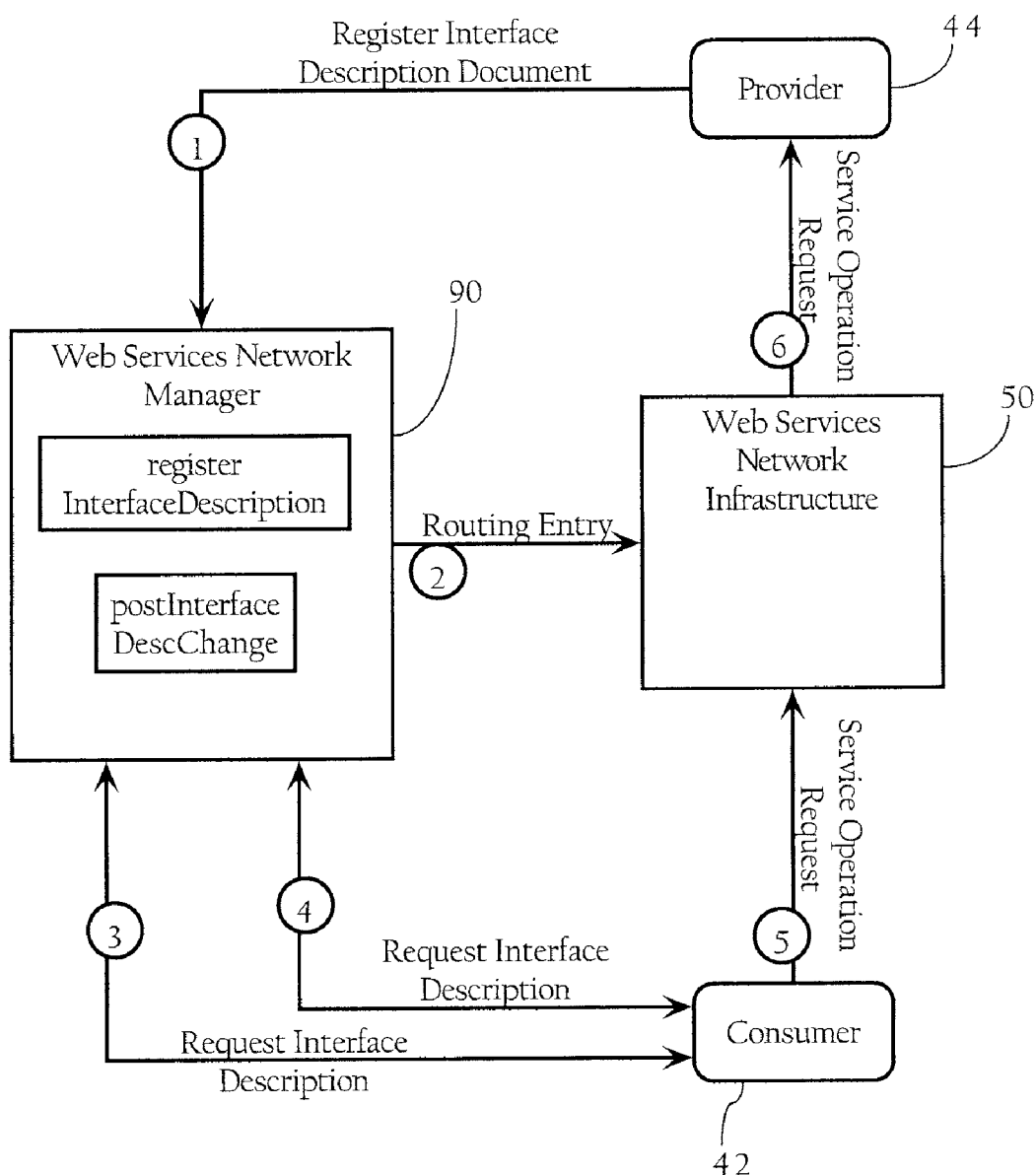
FIG. 2 is a functional block diagram showing the functionality and operating elements associated with the dynamic web services interface description system according to an embodiment of the present invention.

In one embodiment, web service consumers 42, during initialization of the application or when composing a request invoking a given web service, can be configured to access the latest interface description dynamically generated by web services network manager 90. FIG. 2 illustrates the process flow associated with web services consuming applications configured, according to an embodiment of the present invention, to check for the latest interface description and to use the mutable elements in the interface description in composing requests to the corresponding web service. As discussed above, a web services provider registers a web service, providing an interface description, with web services network manager 90 (FIG. 2, #1). Web services network manager 90 processes the interface description to identify and create the required routing information and configures the web services network infrastructure accordingly (#2). To develop a consuming application, an end-user associated with a web service consumer requests an interface description during discovery of registered web services (#3) and uses the interface description to develop a consuming application. For example, various elements such as endpoint location (host value) can be designated as mutable, requiring access to the latest interface description. The consuming application is configured to access web services network manager 90 for the latest, dynamically generated version of the interface description either at initialization of the application or during composition of a request to a web service provider (#4). Web services network manager 90, in one embodiment, can select a given routing node from a plurality associated with web services network infrastructure 50 based on a variety of factors, such as load balancing, performance, failover, etc. Using the mutable elements in the latest version of the interface description (such as endpoint location of a routing node within the web services network infrastructure), the consuming application composes a request and transmits to a routing node in the web services network infrastructure 50 (#5), which opens a connection with web services network provider 44 and forwards the request (#6), as discussed above.

B.2.c. Providing Updates to Interface Descriptions Using Publish/Subscribe Functionality In one embodiment, updates to interface descriptions can be provided to consuming applications as topics in a publish/subscribe system. Publish/Subscribe systems operating within the context of web services network architectures are described in U.S. application Ser. Nos. 10/350,644 and 10/350,645, incorporated by reference herein. FIG. 11 provides a functional diagram illustrating the use of a publish/subscribe system to provide updated to interface descriptions to consuming applications. For example, a web service provider 44 or web services network manager 90 can create a topic directed to send updates to a given web service. A web services consumer 42 can subscribe to the topic and configure a topic listener 43 to which messages associated with the topic are directed. Accordingly, web services network manager 90 can use the publish/subscribe functionality to notify consuming applications of any changes within its operating environment, such as a change to the routing node locations or supported bindings. Additionally, the web services provider 44 can use the publish/subscribe functionality to notify consuming applications of any changes to other interface details.

B.3. Instancing

Embodiments of the present invention further support instancing of web services, or other network-accessible computing resources, according to which a given web service, or other network-accessible resource, as defined by its interface at a particular point in time, may be registered as a distinct entity, even if that web service, or other network-accessible computing resource, has been registered at a previous point in time. In one embodiment, instancing is implemented within the context of web services network manager 90 using a versioning mechanism. Each time a service, or other network-accessible computing resource, is registered, web services network manager 90 assigns it a version number that may be used to refer to that particular service instance. By default, routing nodes within the web services network infrastructure will route to the highest-numbered instance of a service, or other network-accessible computing resource. However, consuming applications that need to utilize earlier versions of a service may do so by explicitly specifying the appropriate version number. This, for example, allows web service providers to upgrade Web service consumers to the latest version of a service in a highly automated manner.

Just as with Virtualization, the Instancing process begins with registration of a Web service, or other network-accessible computing resource, with web services network manager 90. In one embodiment, a user associated with a web service provider logs into the web services network manager 90 and submits information concerning a particular web service, or other network-accessible computing resource, such as an interface description. Web services network manager 90 stores the information in association with a service identifier or other identifying token, including a version identifier (e.g., "v1", "1", "A", etc.), or other qualifying decorator. After registration of the web service, or other network-accessible computing resource, is complete, the web services provider can re-register the same service, or other network-accessible computing resource, again providing information required for registration and discovery of the service, or other network-accessible computing resource. In one embodiment, web services network manager 90 allows the web service provider the option of overwriting the original service registration, or registering the present instance as a new version of that service. If the web service provider elects to create a new version of the web service, web services network manager 90 creates a new web service entity corresponding to the new version of the web service, applying, in one embodiment, a version number "n" to that instance of the service, where n is the number of times instances of that service have been registered with web services network manager 90. In addition, the user will be prompted to select a set of those operations which are to be represented in the registered service. Only those operations selected will be listed as operations associated with that service as it is displayed during discovery, and only operations corresponding to the selected operations will be available for use as part of the registered instance. In other words, the abstraction of the service created as part of the registration supports selective operation configuration. In one embodiment, web services network manager 90 creates routing information related to the new instance of the web service and pushes the information to the web services network infrastructure 50.

Web services network infrastructure 50, as discussed above, allows web service consumers to dispatch either generalized requests, which are always routed to the latest version of a service, or qualified requests, which are routed to the specified version of a service. Specifically, when a consuming application composes a Web service request, it sets the request header to refer to the Web service by name (see above), and dispatches the request to a routing node within web services network infrastructure 50. The URI in the request header containing the web service name may either be general, such as "DocParseService," or qualified, such as "DocParseService-v1." The routing node associated with web services network infrastructure parses the routing header and examines the service name in the URI. If the service name is a general identifier, the routing node routes the service operation request using the information associated with the latest version of the service. Otherwise, if the service name identifies a specific instance, the routing node uses the information associated with the specified instance of the service to route the request. The embodiment described above embeds the versioning information within the service name according to a predefined convention. As one skilled in the art will recognize, however, version information may also be maintained in a separate field in the header including the service and operation identifiers.

Application to Distributed Web Services Network Architecture

Figure 3:
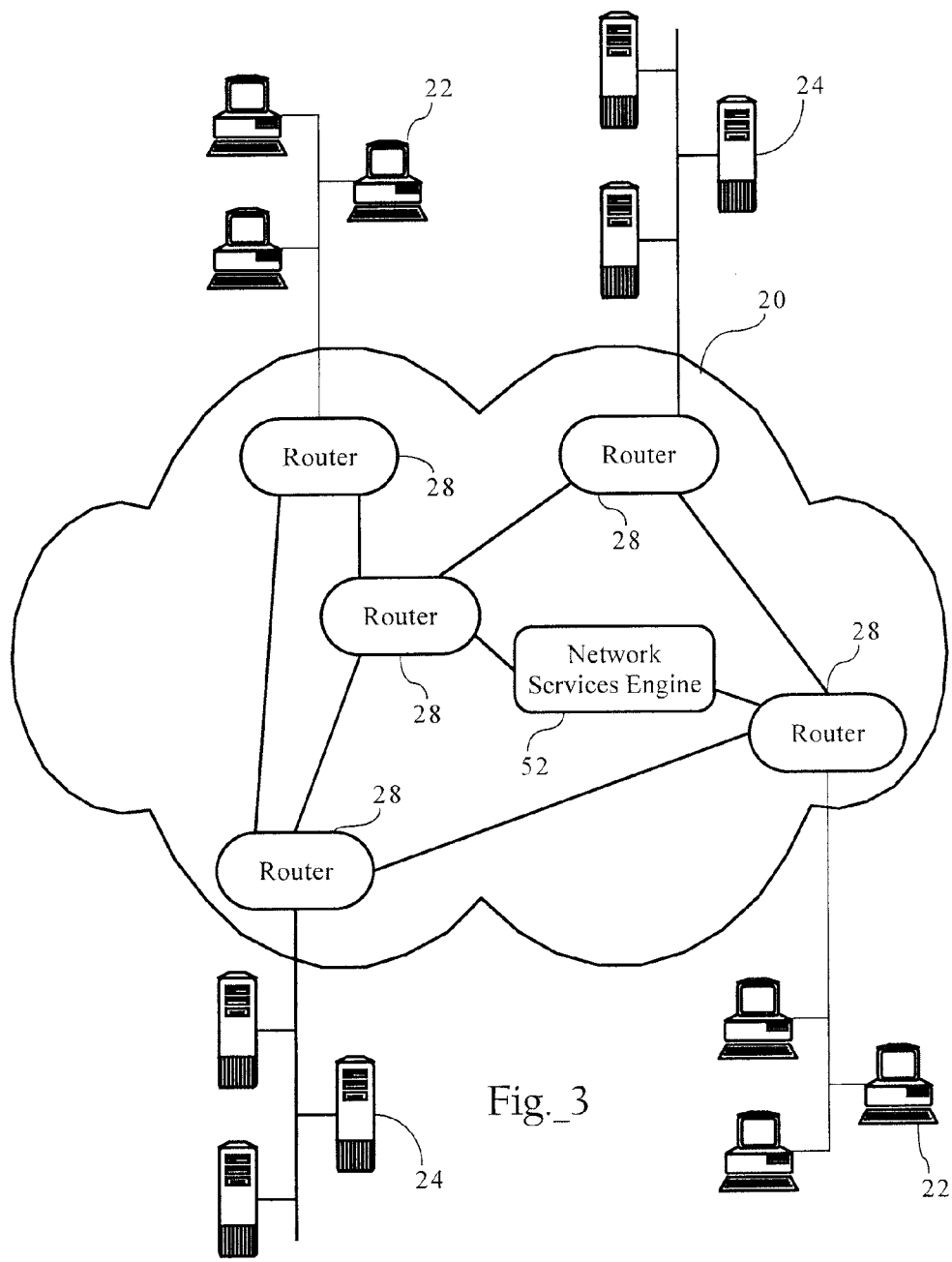
FIG. 3 is a functional block diagram illustrating a computer network environment including an embodiment of the distributed Web services network according to the present invention.

For didactic purposes, the following describes application of an embodiment of the present invention to a distributed Web services network architecture disclosed in U.S. application Ser. No. 09/990,722. FIG. 3 illustrates a computer network environment including an embodiment of the present invention. As FIG. 3 illustrates, the computer network environment comprises a plurality of host nodes, such as client computers 22 and servers 24, interconnected by computer network 20. Computer network 20 comprises routers 22 and other networking equipment to transmit and route data between host nodes connected to the network. Computer network 20 further comprises network services engine 52 operably connected to at least one routing device augmented to include the functionality of a network services switch 56 thereby enabling a distributed Web services network according to an embodiment of the present invention, as more fully described below. In one embodiment, the Web services network enabled by the present invention employs standard Internet and web services protocols, such as HTTP, SOAP and XML, to exchange data. However, any suitable protocols can be used.

I. Computer Network Environment

Figure 4:
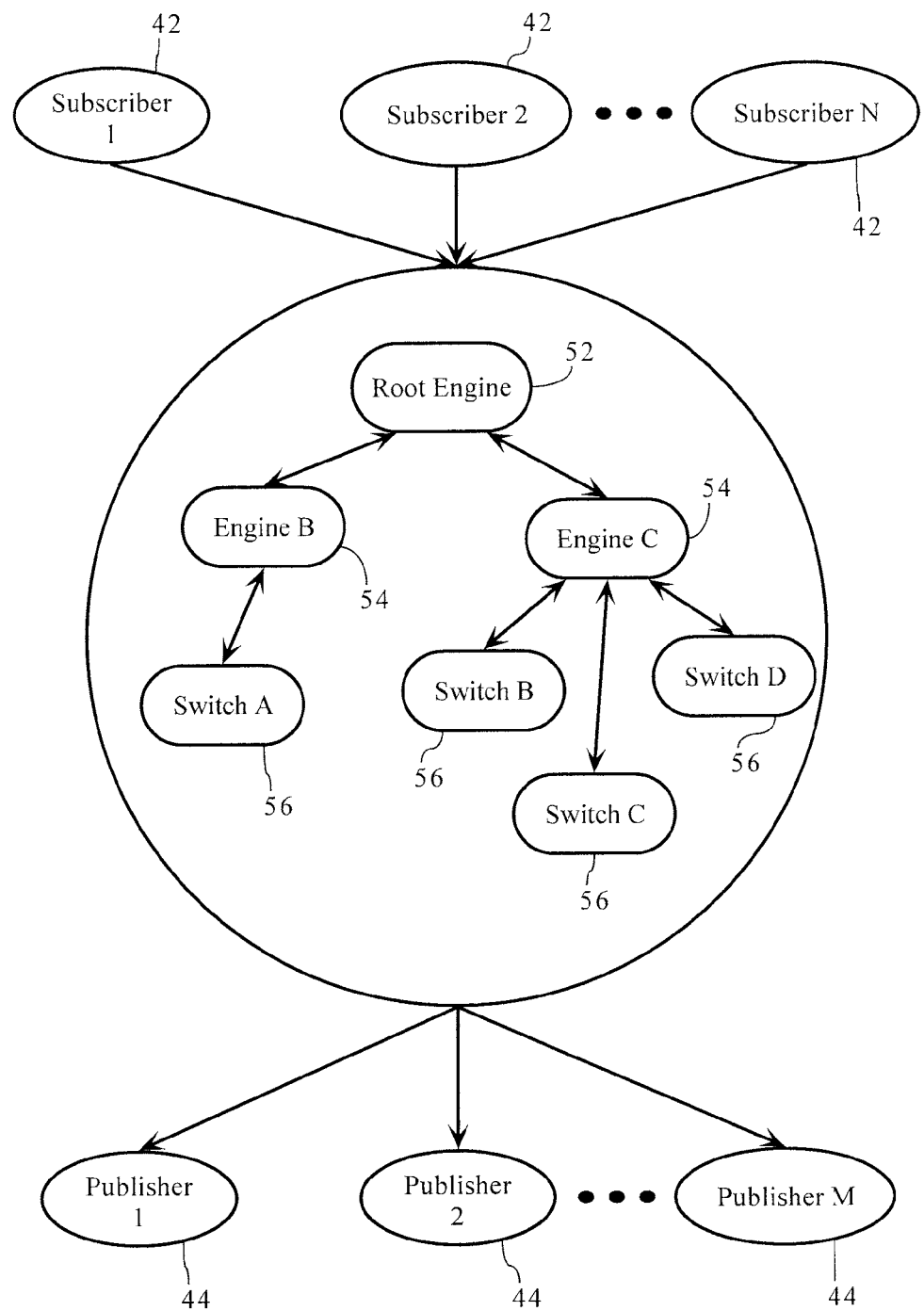
FIG. 4 is functional block diagram setting forth the network architecture associated with an embodiment of the present invention.
Figure 5:
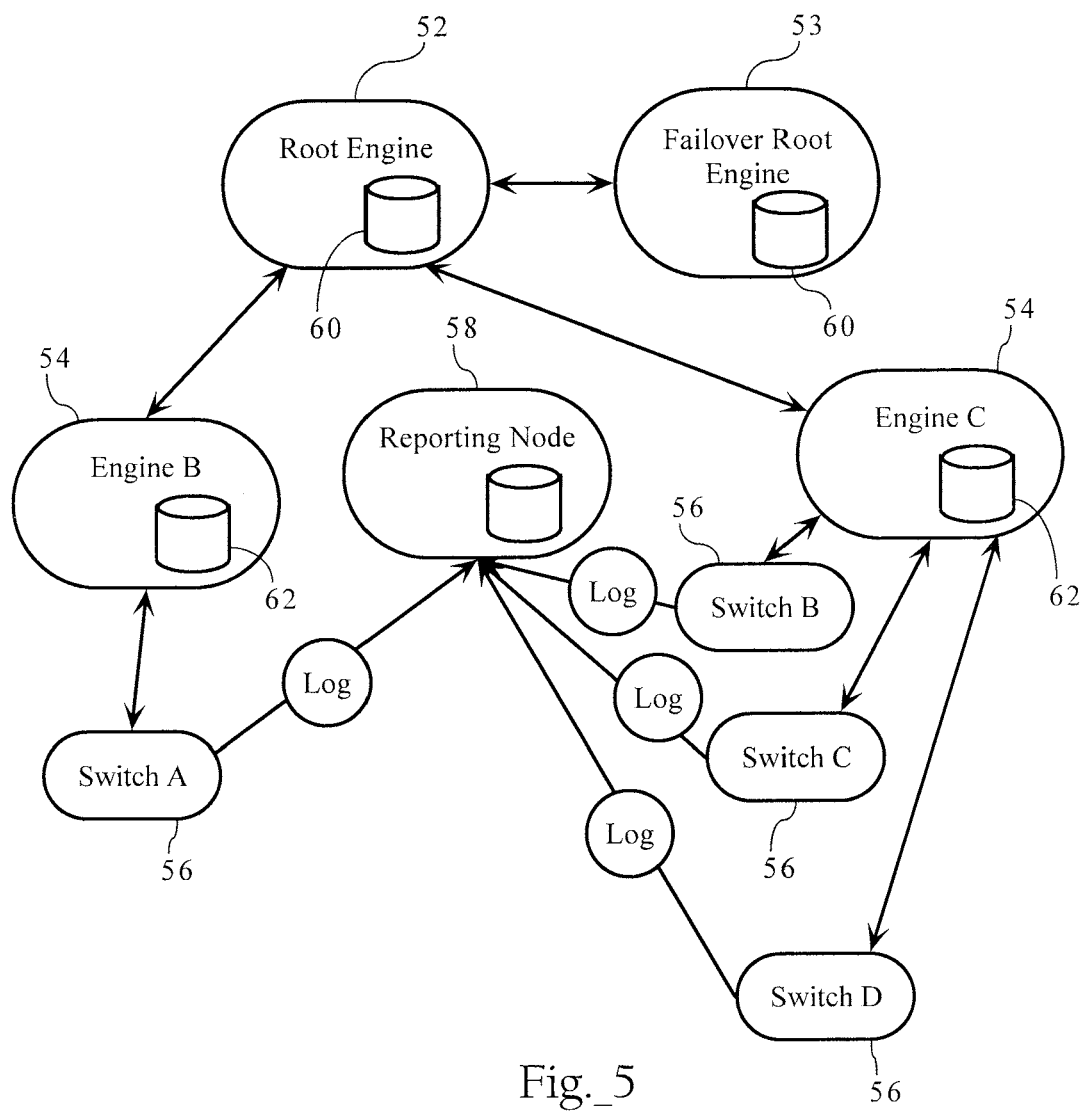
FIG. 5 is a functional block diagram providing a Web services network architecture including reporting functionality on a dedicated node.

The distributed Web services network architecture according to an embodiment of the present invention comprises at least one network services engine 52 or 54 operating in connection with at least one least one network services switch 56. FIGS. 4 and 5 illustrate the distributed Web services network architecture according to one embodiment of the present invention. FIG. 4 provides a basic block diagram illustrating the topography of a Web services network that utilizes one or more instances of network services switch 56. FIG. 4 sets forth a Web services network including N subscriber nodes 42, M publisher nodes 44 and seven routing nodes, four of which are instances of network services switch 56 and three of which are instances of network services engine 54. The directed lines pointing to and from the network sphere represent the path taken by service operation requests emanating from subscriber nodes 42 passing through the network to publisher nodes 44. The lines between routing nodes represent routing table dependencies, as more fully described below.

As discussed in more detail below, network services engines 52, 54 include functionality associated with all aspects of a Web services network, including network and routing node configuration, network maintenance, discovery, registration, subscription, logging and reporting, as well as the handling of routing and associated tasks. In one embodiment, the functionality of network services engines 52, 54 are presented as internal Web services on the network. As discussed below, network services engines 52, 54 are also operative to support and maintain network services switches 56 associated therewith. In one form, network services engines 52, 54 may be configured to operate in a mode where only a subset of available functionality is enabled. For example, a particular engine, such as root engine 52, may be configured such that it does not perform routing of service operation requests and responses.

As FIG. 5 shows, each network services engine 52, 54, in one embodiment, operates independently with its own database 60 and its own configuration set. Some of the tasks performed by network services engines 52, 54 can be quite resource-intensive. Network services engine 54 supports the creation of highly distributed systems but can be a large application requiring large amounts of persistent memory and processing power. A good example of this is logging of service operation requests and responses traversing the network. Because every request and every response that flows through a network services engine requires a certain amount of metadata to be persisted, it is necessary that engine 54 be capable of handling a potentially heavy load of database interactions.

While multiple instances of network services engine 54 may be installed to support a highly active Web services network, such a configuration can be very costly, requiring installation and configuration of multiple, dedicated servers on computer network 20. The introduction of network services switch 56 provides a more efficient and less expensive alternative. Network services switch 56 includes a subset of the functionality of network services engine 52 or 54 and is capable of handling routing of service operation requests and responses, as well as associated tasks such as application-level security. Operation of network services switch 56 is designed to reduce the amount of computational resources required to function at an acceptable level. Network services switch 56, in one embodiment, has a small footprint, rendering instances of switch 56 suitable for installation on embedded systems associated with computer network 20, such as network routers 28. For example, introduction of network services switch 56 separates routing and associated tasks from other Web services network platform functionality, thereby allowing network administrators to distribute Web services routing functionality and the resources demanded by such routing tasks across many inexpensive nodes in a network environment. Such a configuration allows for rapid scalability in a highly cost efficient manner. Accordingly, embodiments of the present invention allow a network administrator to leverage an enterprise's investment in existing network infrastructure to create a Web services network capable of handling large amounts of Web services traffic.

In one form, network services switch 56 operates in conjunction with a plurality of additional instances of network services switch 56 installed on existing routing nodes in the network infrastructure or on dedicated devices. The plurality of network services switches depend on one or more instances of network services engine 52 and/or 54 to handle activities requiring persistent storage of data, such as logging, reporting, maintenance and configuration. Unlike the Web services networks of the prior art, where the Web services platform is associated with, and all Web services routing occurs at, a single point of integration located on a server or cluster or servers in a particular network, the Web services network platform functionality of the present invention is distributed across the network environment.

A. Network Services Engine

Network services engine 52, 54 supports all aspects of a Web services network, including network and routing node configuration, security, network maintenance, logging and reporting, as well as the handling of routing and associated tasks. As discussed below, network services engines 52, 54 are also operative to support and maintain network services switches 56 associated therewith. In one form, network services engines 52, 54 may be configured to operate in a mode where only a subset of its functionality is enabled. For example, a particular engine, such as root engine 52, may be configured such that it does not perform routing of service operation requests and responses. As FIG. 5 illustrates, certain instances of the network services engine 54 are used specifically for gathering reporting data. Such instances are referred to as reporting nodes or servers 58. In some configurations, reporting node 58 is dedicated solely to reporting and logging of data associated with usage of Web services network 40, while, in other configurations, reporting node 58 also supports Web services routing functionality.

In one embodiment, the functionality of network services engine 54 may be implemented in hardware, software, or a combination of both. In one embodiment, network services engine 52, 54 is an application executed by a server operably connected to computer network 20 (see FIG. 3). The server is a programmable computer executing computer programs, and comprising at least one processor, a data storage system, at least one input device, and at least one output device. In one embodiment, network services engine 52, 54 comprises a persistent data store, such as network database 60, 62 respectively. Network databases 60, 62 store Web services routing table data, as well as configuration data relating to the operation of Web services network 40. Network databases 60, 62 are stored in persistent, non-volatile memory, such as a hard-disk drive or any other suitable form of persistent memory. In one preferred embodiment, network databases 60, 62 reside on the same respective servers executing the functionality of network services engines 52, 54. However, in another embodiment, a single database server can support multiple instances of network database 60, 62 each associated with a network services engine 52, 54.

Network services engine 52, 54 is operative to maintain and update routing table data for network services switches 56 operably connected thereto. Network services engines 52, 54 are also capable of making database entries on behalf of network services switches 56, such as for service operation logging. Network services engines 52, 54 are also operative to share Web services network configuration and/or routing data with other instances of network services engine 52, 54 associated with the computer network environment. As discussed below, the routing table data applies to the entire Web services network not just a single network services engine. Accordingly, a change to routing table data propagates through the Web services network, affecting every routing node (e.g., engine and/or switch) that enables that network.

Network services engine 52, 54 further supports at least one handler that implements a platform service associated with the Web services network. A handler is functionality directed to maintenance, configuration, and/or support of a Web services network. In one embodiment, operations associated with handlers are presented as internal Web services available on one or more instances of network services engine 52, 54. For example, a handler service operation may assist end-users with utilization of Web services network 40. For example, a particular handler operation, when invoked, provides information to a user describing which Web services he has permission to access. Other handler service operations include functionality associated with routing entity requests, entity creator requests, and the like (see below).

As discussed in more detail below, a Web services network manager 90 or other suitable management application or platform allows network administrators to configure network services engines 52, 54, network services switches 56 and, thus, operation of Web services network 40. The Web services network manager facilitates configuration of all data required for routing, security and user management. Network services switches 56 depend on instances of network services engine 52, 54 for routing table and other associated data. Network services switches 56 also depend on engines 52, 54 to provide functionality allowing for maintenance, configuration and support of Web services network 40. For example, embodiments of network services switch 56 do not store routing table data in persistent memory, but depend on network services engine 52, 54 to provide this information on demand and/or by push updates, as required. Accordingly, configuration of network services switch 56 entails providing a computer network address of a network services engine 54 with which it communicates for routing table and other configuration data.

B. Network Services Switch

Network services switch 56 routes service operation requests and responses in the same manner as network services engine 52, 54. In one embodiment, network services switch 56 is further operative to perform other routing-related tasks, such as application-level security. As discussed above, however, network services switch 56 relies on one or more instances of network services engine 52, 54 for non-routing related functionality associated with network 40, such as configuration, maintenance, support, logging, etc.

As discussed above, network services switch 56, in one embodiment, has a small footprint enabling its installation on standard networking equipment, such as network router 28. Although network services switch 56 may run on such lightweight hardware platforms, such hardware platforms must be able to accommodate an operating system and network services switch 56. In one embodiment, the hardware platform should preferably include some form of persistent memory, such as a hard drive or an Application Specific Integrated Circuit (ASIC), allowing for storage of an operating system and an instance of network services switch 56. In one embodiment, network services switch 56 operates in connection with an embedded Linux or Solaris operating system including a Java Runtime Environment supporting all requisite Java networking libraries. In such an embodiment, the hardware platform must also be capable of executing a servlet engine at a reasonable performance level. However, network services switch 56 may be implemented in other programming environments, such as C or any other suitable programming environment. Suitable routing devices include Cisco® Content Services Switches, Nortel® Alteon 180 routers, and the like. Of course, network services switch 56 can be ported to any suitable platform or runtime environment, including service appliances such as Crystal PC® CS200/300, or Hewlett Packard® P4500. To configure network services switch 56, a network administrator must provide the computer network address of the network services engine to which it can make requests for routing table updates, as well as a computer network address of the reporting node to which it sends event logging requests.

One the features enabled by embodiments of the present invention is inexpensive fail over support. It is important that the disruption of a single network node not bring down an entire Web services infrastructure. Because it is relatively inexpensive to implement network services switch 56 at existing routing nodes in a computer network environment, it is practical to distribute it in large numbers across the network, thereby enhancing a subscriber's ability to employ automated fail over functionality if a particular routing node fails.

C. Platform Services and Web Services Network Manager

As discussed above, network services engine 52, 54 supports handlers implementing platform services, such as the registration of end-users, creation of topics, and queries for services available to a given subscriber. As discussed above, handler services are Web services accessible by the generation of a service operation request as any other Web service. Accordingly, this configuration allows enterprise customers to integrate platform services into their own systems and applications, as opposed to being forced to access platform services through a third-party application interface. Nevertheless, embodiments of Web services network 40 include Web services network manager 90 as more fully discussed below. The following also illustrates the platform services offered by network services engines 52, 54.

Web services network manager 90 provides an interface facilitating access to functionality for network administrators and other users of the Web services network enabled by the present invention. For example, Web services network manager 90 provides the user interface through which Web services are configured, registered, and discovered, by which access to those services may be controlled, by which network services engines 54 and switches 56 are configured, and by which the user rights of those participating in the network may be administered. In one embodiment, Web services network manager 90 further provides access to service activity reporting capabilities and customer service functionality.

Web services network manager 90 presents the user interface by which authenticated end-users interact with and/or configure the Web services network of the present invention. In one embodiment, Web services network manager 90 is a Web-based application executed on a server or other computing device operably connected to the computer network environment. In another embodiment, Web services network manager 90 may reside on a desktop computer 22 associated with a network administrator. As discussed above, the functionality allowing for maintenance, configuration, support and other administrative tasks associated with Web services network 40 is, in one embodiment, available as Web services residing on one or more instances of network services engines 52 and/or 54. In one embodiment, a set of SNMP interfaces allow access to such administrative functionality without the use of Web services network manager 90. To implement an end-user command, Web services network manager 90 generates an appropriate service operation request and transmits it to a network services engine 52 or 54. Web services network manager 90 is further operative to allow for configuration of all nodes associated with a Web services network concurrently or individually.

Web services network manager functionality can be divided, for didactic purposes, into several interrelated areas or realms. The Web services network management application can include all or a subset of the functionality described below. For example, although subscribers, in one embodiment, must formally subscribe to a service, other embodiments allow for the utilization of services without formal subscription protocols.

C.1. Basic Entity Administration

For illustrative purposes, the various participants and components in a Web service network will be referred to herein as routing entities or entities. In one embodiment, Web services network manager 90, as discussed above, interacts with a database maintaining information relating to the routing entities configured on the Web services network. In one embodiment, the database is a relational database comprising a plurality of tables including fields relevant to the different routing entity types described herein. In one embodiment, the Web services functionality supports the following entities:

Organizations: An organization can refer to an individual, a department within an enterprise, an entire enterprise, or any other entity. Both subscribers and publishers are types of organizations within the context of the management application and a Web services network. A subscriber is an organization running applications that utilize one or more Web services. A publisher is an organization defining and maintaining at least one service. All end-users are considered members of an organization. The words "subscriber" and "publisher" are used as modifiers for end-users, allowing the management application to present different interfaces based on the specific role of the user who is currently logged on. In one embodiment, each organization includes a organization name and a unique identifier.

Services: A service is a Web service or application maintained by a publisher. A service includes one or more operations. These are Web services that have been or will be integrated into a Web services network according to the present invention. In one embodiment, each service includes a service name and a unique identifier. A service may further include at least one access control list defining the publishers and/or end-users that may access/subscribe to the service. In addition, as discussed above, web services network manager 90 further supports the instancing of web services, allowing administrators to create and maintain different versions of a given web service.

Operations: The functionality offered by a service is divided into operations, each of which represents a discrete activity that can be performed by a publisher on behalf of a subscriber in response to a service request.

Topics: A topic is a named abstraction for a particular subject of interest. A topic includes a subscription list, including at least one subscription representing an agreement to receive information concerning a particular topic. Each subscription usually contains all data required for a system to deliver appropriate information to those who require it, such as the address of the recipient. In one embodiment, each topic also includes at least one of two access control lists: 1) a list defining the publishers and/or end-users who may publish messages to a topic, and 2) a list defining the subscribers and/or end-users who may subscribe to a topic. The implementation of topics in the context of a web services network is described in U.S. application Ser. Nos. 10/350,644 & 10/350,645 incorporated by reference herein.

End-Users: An end-user is an individual or computing unit logged into a host node (e.g., client computers 22 or servers 24) and accessing the management application. End user also refers to individuals or entities whose use of a subscriber application results in a service operation request being transmitted over the Web services network of the present invention. Those end-users of the management application possessing adequate permission levels carry out administrative tasks with respect to each of these routing entities. Such tasks include searching, browsing, creation of new entities, editing existing entities, and deletion of obsolete entities.

C.2. User Account Management

Web services network manager 90 also facilitates creation and management of user accounts. Each user account has associated therewith a set of access privileges to the functionality available over the management application or other administrative tool. An IT administrator may have privileges to create and modify user accounts and entities. An administrative end-user associated with a subscriber may also have the ability to modify or create user accounts within the subscriber realm. An administrative end-user associated with a publisher may have access privileges to register or delete services or operations within the publisher's realm. In one embodiment, a user account further includes access privilege information relating to specific services or operations available to the corresponding end-user. The management application supports similar capabilities available with respect to entities: searching, browsing, creation of new accounts, editing existing accounts, and deletion of obsolete accounts.

C.3. Reporting

Web services network manager 90, in one embodiment, also allows users access to a variety of reports supplying information on various aspects of Web service usage. Both graphical and text-based reports can be supplied, constrained, and organized using a variety of parameters, including specification of included entities, end-users, and date ranges.

C.4. Advanced Entity Administration

One embodiment of the Web services platform enabled by the present invention allows for monetization of Web services. To facilitate monetization, Web services network manager 90 supports additional types of entities and/or entity attributes, in addition to the basic ones described above.

Pricing Models: A pricing model consists of one or more types of charges, as well as a number of parameters (such as price) that provides the means by which amounts owed for service usage can be computed. The management application allows authenticated end-users to create, edit, and delete pricing model entries.

Service Offers: When a publisher offers a subscriber (or group of subscribers) use of a service or a subscription to a topic, this is accomplished by creating a "Service Offer." The Service Offer, in one embodiment, comprises a pricing model, a unique identification (Id) of the Service or Topic being offered, and a list of subscribers to whom it is being offered. Additional terms and conditions may be specified as well. A subscriber gains permission to use a service by accepting the proffered Service Offer associated with it. Users create, edit and delete service offer entries using the management application. In one embodiment, when Service Offer detail pages are viewed by administrators, the number of subscribers accepting that Service Offer are shown.

Organization Groups: Web services network manager 90 also allows publishers to place organizations in named groups. These groups are then used to establish access control rights for services provided by those publishers.

Access Control: Publishers can control access to the services they provide. The process of administering such access controls is also known as "provisioning." Once a subscriber accepts a service offer, it is incumbent on the administrator of the relevant service to provide access in a timely manner. This is done by placing organization and organization groups ("org groups") onto the access control list maintained for that service.

Additional Computed Fields: In addition to the various computed values displayed in entity detail views as specified above, several other values can be computed and displayed:

1) The number of subscribers to a service, for example, can be displayed. This is defined as the sum of all subscribers to all Service Offers that include the service.
2) The average number of requests per day can be shown for both services and service operations.
3) A service operation may optionally have a counter associated with it that is incremented each time the service operation is used. The value of this counter is available as a computed field in the service operation detail and list pages. Users are able to reset the counter manually, through the service operation detail page, or to specify a standard timer reset interval (defaults to 24 hours) through the service operation detail page.

Configurable List Pages: The list view of the Entity Administration Page can be configurable, allowing power users to pick which fields actually appear on the page. Such users will be able to select from amongst a number of optional fields that may be included as columns in the view. For services, one of the optional fields will be "number of Subscribers" (as described in the bullet point above) and "average number of requests per day." For Service Operations, one of the optional fields may be "average number of requests per day."

C.5. Registration & Discovery of Web Services

As discussed above, web services network manager 90 further supports registration and discovery of web services. As to registration, a network services provider submits information relating to a given web service and provides an interface description, such as a WSDL document. Web services network manager 90 persists this information to allow subscribers to discover and possibly utilize the web service.

Web services network manager 90 also facilitates and supports discovery of Web services and topics. As discussed above, discovery is the process by which subscribers search for and browse services and/or topics in order to make utilization decisions.

C.6. Subscription

Web services network manager 90 also supports subscription to services or topics. Subscription is the process by which subscribers actually work through the process of signing up to use a service or receive messages associated with a topic. In one embodiment, all of the various costs, terms, and licensing agreements are presented in a graphical user interface presented by Web services network manager 90. The process culminates in the subscriber either accepting the terms of a service offer or returning to the discovery portion of the application. In one embodiment, acceptance of a subscription ultimately generates a routing entry allowing service operations requests generated by the subscriber to be routed to the service, or allowing topic messages generated by the publisher to be routed to the subscribers.

In one embodiment, a review mechanism allows subscribers to both provide a numerical ranking of services and/or topics (on a scale of one to ten) and provide text reviews of services to share with the rest of the subscriber community. Discovery and administration detail views are extended to include access to reviews. The number of reviews of any given service are provided on the detail page itself, with a link to the actual reviews. The ranking attributed to the service or topic is displayed alongside the review. Both number of reviews (as a link to the reviews) and average ranking are optional fields in the list views of the services or topics.

C.7. Monitoring

In additional to the reporting functionality described above, Web services network manager 90 provides administrators with data concerning certain vital operational aspects of a Web service network. Users can gain quick access to summary information on uptime and performance for any given service and/or service operation. In one embodiment, Web services network manager 90 provides this information within the context of Service Level Agreement (SLA) compliance as it pertains to specific service offers. For example, if a subscriber is viewing performance summary information on a given service that is not in keeping with the SLA associated with the service offer accepted by that subscriber, Web services network manager 90 explicitly informs the subscriber of this violation in the terms of the SLA.

C.8. Notifications

Web services network manager 90 and associated functionality of network services engines 52, 54 further supports notification of end-users. In some cases, is not sufficient to provide such information solely through monitoring screens—users must be immediately notified. For example, Web services network manager 90 supports notification of subscribers if a service or service operation fails beyond a threshold number of times in a given period. In one embodiment, such notifications are in the form of e-mail, pager and/or cell phone calls.

C.9. Inter-Enterprise Web Services Support

In one embodiment, Web services network manager 90 further supports access to a hosted inter-enterprise platform service residing remotely from the enterprise. The inter-enterprise platform allows a plurality of separate Web services networks to "cross-pollinate" each other by providing a central, public access point through which administrators may register services, as well as discover and/or subscribe published Web services of other enterprises.

Inter-enterprise platform functionality falls into one of two broad categories—common publishing and common discovery. Common publishing is the process by which information on services and/or topics existing in disparate Web services networks is provided to the platform. Common discovery is a set of features that allows users of Web services network manager 90 to discover services and topics published into the platform using the same interface utilized in discovering "local" services. In one embodiment, common publishing functionality is available to Master Administrators and Network Administrators only, while common discovery functionality is available to all end-users.

Administrators can publish Web services to the platform by identifying specific service or topic offers they wish to make available through the inter-enterprise platform. All of the information regarding these service or topic offers is then transmitted to the platform site via the service operations that constitute the common publishing segment of the service. This transmission of data will by necessity ripple through the dependency tree in which the service offer resides—for instance, all service operations and pricing models associated with service being offered are transmitted along with the service offer entity itself. The implications for the discovery portion of Web services network manager 90 are less involved. In one embodiment, Web services network manager 90 offers users the option of whether they wish to have remote services displayed and provides a means for differentiating between remote services and "local" services.

C.10. Administrative Dashboard

In one embodiment, Web services network manager 90 features a screen containing summary information. Immediately after logging into the management application, a user is presented with a configurable "dashboard" screen that includes a summary of information on Web service networking management issues relevant to the user. An example of a typical field that might be displayed on the dashboard is the number of service operation failures attributed to services associated with the user's organization.

C.11. Security

Web services network manager 90, in one embodiment, is accessed solely through password-protected user accounts. The following security-related features may also be included:

- All users of Web services network manager 90 log on through a common dedicated page.
- Logons are invalidated after some reasonable amount of a time (e.g., two hours).
- Users are not able to evade the log-on page by directly accessing other pages in the application.
- Users are able to retrieve lost passwords via e-mail.

C.12. User Roles

In one embodiment, Web services network manager 90 supports various user roles that can be associated with end-users. A user role is a predefined set of permissions and access privileges enabling and/or enforcing a role for a particular end-user or group of end-users. In one embodiment, such user roles include:

Master WSNO (Web Service Network Operations) Administrator: Web services network manager 90 defines one user with this role upon installation. In one embodiment, no additional users of this type may be created, and the single user of this type may never be deleted. The Master WSN Admin role has all permissions. It is the only role with the ability to create other admin accounts. A user in this role is referred to as the "master admin."

Network Operations Administrator (NOA): This role includes the same privileges as the Master WSNO, except for the ability to create other NOA accounts. A user in the role is referred to as a "net admin."

Organization WS (Web Service) Administrator: Organization Administrators have rights to view, create, edit and delete entities "owned" by their organization, including user accounts below the Administrator level. A user in this role is referred to simply as an "admin." Admins are always classified as being either "publisher admins" or "subscriber admins." This is important because the management application presents publishers and subscribers with different user interfaces adapted to their respective roles in administration of the network.

WS Specialist: A Web Service Specialist has rights to view or create and edit most entities belonging to his Organization. Exceptions to this are user accounts and the entity representing the Organization itself. A user classified as a Specialist may also view services and operations defined by other Organizations, as well as Service Offers that have been extended to the Organization to which that user belongs. Specialists should also be classified as either Publishers or Subscribers.

Visitor: A visitor account provides the rights to view all of the same entities available to a Specialist. A visitor does not, however, have "edit" or "delete" rights of any kind. Of course, a wide variety of user roles and permission sets may be employed in connection with the present invention.

C.13. Web Services Network Topology

In one embodiment, the subscriber view presented by Web services network manager 90 allows end-users to gain insight into network topology and other infrastructure considerations associated with service operations. In one embodiment, each service operation includes a "distance" attribute, a computed field characterizing the proximity of a subscriber's Web service consuming applications to the infrastructure on which a given service operation actually executes. In one embodiment, the distance attribute may have one of three values: 1) "local" (published by and subscribed to by the same organization); 2) "global" (published by and subscribed to by different organizations that are part of the same Web services network); and 3) "peered" (provider and subscriber application are on different Web services networks).

In addition, the Web services network according to one embodiment of the present invention includes functionality allowing for a determination of the number of network hops taken by a service operation request from a subscriber node to a publisher node. In one embodiment, network services engine 54 includes "traceroute" functionality to determine the number of hops between it and the publisher node corresponding to a service operation request. In addition, the subscriber node includes traceroute functionality to determine the number of hops between it and network services engine 54 and report such information to network services engine 54. This configuration makes it possible to build up a body of statistical data that will allow administrators and subscribers to make reasonable estimates of the number network hops typically sitting between a request's source and its destination.

5D. Network Architecture

FIG. 5 sets forth an embodiment of the Web services network including root engine 52, fail over root engine 53, network services engines 54, reporting node 58, and network services switches 56. As with FIG. 4, the lines between routing nodes represent routing table dependencies. The lines included between network services switches 56 and reporting node 58 represent the flow of data associated with the logging and reporting functionality described herein.

An important aspect of the network architecture of the present invention is functionality supported by network services engines 52, 54 and switches 56 allowing for efficient distribution of routing table data across a Web services network across all routing nodes. In one embodiment, all nodes associated with the network (e.g., network services engines 52, 54 and switches 56) maintain their own respective routing tables and are capable of routing any service operation request or response. As to network services engines 54 such local routing tables are contained in databases 62, whereas for network services switches 56 the routing tables, in one embodiment, are maintained by suitable data structures in Random-Access Memory (RAM).

Embodiments of the present invention avoid the often unneeded overhead associated with maintaining a comprehensive routing table on each routing node. For example, according to typical usage patterns, it is likely that subscriber systems (such as client computers 22 or servers 24) that make use of the same service are likely to transmit service operation requests over the same network service switch 56 or group of collocated switches. Since only these switches route requests for a given service, there is no need for other (potentially numerous) network services switches 56 in network 40 to have routing table entries related to that service in their respective local routing tables. Accordingly, each routing node of Web services network 40 maintains a local routing table consisting of a subset of a global or comprehensive routing table. In one embodiment, root network services engine 52 maintains a global routing table to allow for distribution of routing table data to various routing nodes on demand. As more fully described below, when a routing node is confronted with a routing entity not contained in its local routing table, it transmits a routing entry request to its parent node to provide the requisite routing data. In one embodiment, when a network services switch 56 experiences a "routing fault," it transmits a routing entry request to a parent network services engine 54 to provide the requisite routing entry. Accordingly, through use, network services switch 56 obtains and stores on its local routing table the routing data required to support its routing responsibilities in Web services network 40.

Similar to network services switch 56, network services engine 54 possesses whatever routing table entries are necessary to satisfy any service operation requests it has received. In addition, network services engine 54 further contains the routing table entries required to support switches 56 for which it is responsible. In addition, the local routing tables residing on network services engines 54 are also updated on demand in response to both service operation requests and the need to support routing entry requests of network services switches 56 associated therewith.

To maintain routing table data across Web services network 40, the nodes comprising the Web services network are arranged in a tree structure where, in one embodiment, network services switches 56 occupy the leaf nodes (see FIGS. 4 & 5) and network services engines 52, 54 occupy non-leaf nodes of the tree structure. In one embodiment, this network architecture and the nodes comprising it possess the following properties and functionality, or a subset thereof:

New routing table entries may be created at any non-leaf node in the tree.

When a new routing table entry is made, it is pushed up the tree in such a way that all ancestors of the node at which the entry is made rapidly acquire the contents of the new entry.

As a consequence of the two points listed above, the root node will always have a complete global routing table.

When a routing fault occurs (e.g., routing entity not found in local routing table), the node at which the fault occurred will ask its parent to provide the missing routing table entries. If the parent also lacks the required data, it will ask its parent, and so on. If the request fails at the root node, the routing fault is declared final and an exception is propagated back to the node at which the original routing fault occurred.

Fault tolerance is supported by this tree structure in the following ways: If a leaf node goes down (OS or hardware failure), requestors can fail over to any other leaf node in the network. If a non-leaf node goes down, the network can be reconfigured around that node simply by "pointing" the downed node's children at the downed node's parent. As FIG. 5 shows, the root node 52, in one embodiment, is replicated by failover root node 53 for purposes of supporting fail over functionality. In one embodiment, if a service operation request to root node 52 times out, engine 54 or switch 56 is configured with the IP address of failover root node 53 and accesses it. Such a fail over may generate an automatic notification to the network administrator.

While new routing table entries need only be pushed up the tree, routing table changes are pushed both up and down the nodes in the tree, to ensure that all nodes possessing the changed entries are made current as rapidly as possible. For instance, if a particular Subscriber is granted access to given service operation, then the Subscriber must be allowed to access that operation through any routing node on the network. Similarly, if a Subscriber subscribes to a given topic, all routing nodes on the network must be reconfigured to include the new subscription. Still further, if the endpoint location associated with a given service changes, the new endpoint location must be distributed to all routing nodes.

The network architecture described above allows for certain advantages. For example, the addition of new routing nodes, especially network services switches 56, is fairly straightforward, requiring little time for configuration. Rather, the routing node acquires the requisite routing table entries over time as it responds to service operation requests and/or receives routing table updates. As discussed below, the network architecture described above facilitates merging of two separate Web services networks.

In addition, although the Web services networks illustrated in FIGS. 4 and 5 show a plurality of network services engines 52, 54, the Web services network architecture can comprise a single root network services engine 52 operating in connection with at least one network services switch 56. Networks will tend to gain deeper topologies and additional network services engines 54 due to mergers. Specifically, as smaller networks are merged to form larger networks, the number of routing layers present will gradually increase. In a typical configuration involving large Web services networks, the routing functionality of root network services engine 52 will be disabled to free up processing power for the administrative and maintenance tasks discussed herein. Moreover, while reporting functionality can be incorporated into root network services engine 52 or other network services engines 54, particularly busy networks may include a dedicated reporting node 58, as shown in FIG. 5.

Figure 6:
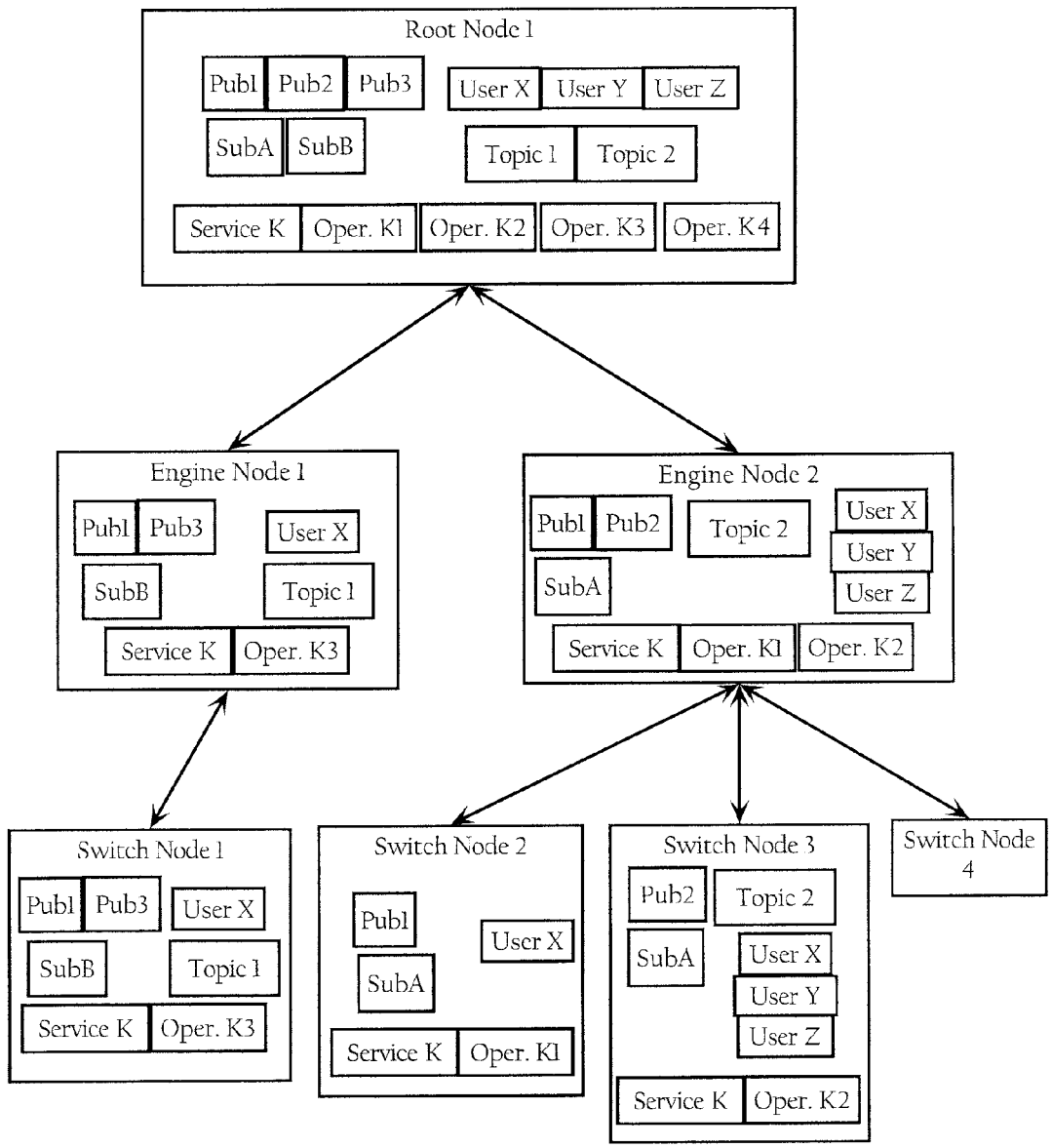
FIG. 6 is a diagram illustrating a possible state for routing tables across an embodiment of the Web services network of the present invention.

For didactic purposes, FIG. 6 illustrates a possible routing table configuration state for an (artificially) small Web services network according to the present invention. Each box in the above diagram represents a routing node. The interior boxes represent routing entities. The non-directed line segments denote flow of data, and imply parent/child relationships. As FIG. 6 illustrates, the local routing table of each node is the union of the local routing tables of its child nodes. For example, Engine Node 2 54 has routing table entries for Operation K1 and Operation K2 because requests for these operations have passed through its child nodes. It lacks a routing table entry for Subscriber B because none of its children have ever received a service operation request from Subscriber B. Switch Node 4 is an example of a routing node newly introduced into the network or recently re-initialized to erase the routing table data stored in RAM. As discussed more fully below, when Switch Node 4 receives its first service operation request, it transmits a routing entry request to its parent node, Engine Node 2, for the routing table entries required to fulfill that request and enter them into its local routing table.

E. Unique Network Identifications

An embodiment of Web services network 40 features unique network identification functionality to facilitate a subsequent merging of two separate networks (see Section II.D., below). Two different instances of network services engine 52 on two different Web services networks can have routing table entries that use the same identifications to refer to two different entities, thereby rendering merging of the networks quite problematic. For instance, Subscriber A may have an identification of 122 on a first network, while Subscriber B may have the same identification on a second network. Moreover, Subscriber A may be registered on both networks, possessing an identification of 122 on the first network and an identification of 235 on the second network.

Accordingly, to facilitate merger of two separate networks, embodiments of the present invention implement protocols and functionality resulting in the generation of globally unique routing entry identifications when new routing entities are added to the global routing table of a network. In one embodiment, identifications for publishers, subscribers, and end-users are globally unique in that each identification is not used to identify any other entity of the same type. Services are unique per-Publisher, while Operations are unique per-Service.

E.1. Assignment of Network Operator Identifications

In one embodiment, each network operator (typically, a single enterprise) of one or more Web services networks is assigned a globally unique identification. In one embodiment, an automated or manual process is employed to assign such identifications to network operators before deployment of the network. In one form, this unique network operator identification is part of the configuration of the corresponding network's root engine node and becomes part of that node's persistent store.

E.2. Assignment of Web Service Network Identifications

Those individuals responsible for Web service network configuration and administration within a network operator organization assign an identification to each Web services network they deploy and configure. The values of such Web service network identifications are important only in that they are unique within the realm of that network operator organization, and may be decided upon in a fairly arbitrary fashion. Each Web service network identification is applied to the configuration of each non-leaf node in the respective network and is persistently stored by each non-leaf node. Administrators may change Web service network identifications (though this requires changing the network identification applied to each node in the network), to allow the uniqueness constraint to be followed when two networks are merged—i.e., every network maintained by a network operator has an identification different from all other networks maintained by that operator.

E.3. Globally Unique Identification Generation

In one embodiment, the following protocol is used to generate globally unique identifications for routing entities. Each identification comprises four delimited parts, each of which is an integer: 1) The Network Operator Identification (above); 2) The Web Service Network Identification (above); 3) An Entity Identification (see below); and, optionally, 4) a time stamp.

An entity identification uniquely identifies a routing entity within a particular Web service network. As discussed below, entity identifications are generated at root network service engine 52, which makes available over network 40 an entity creator service. In one embodiment, the entity creator service includes operations corresponding to each routing entity type. Accordingly, the management application is configured to transmit entity creator requests to the root node 52. In one embodiment, the timestamp consists of the last four digits of time expressed down to the millisecond at which the identification is generated. In other embodiments, the time stamp may be replaced with a random number generated by any suitable random number technique. However, any suitable technique for generating an arbitrary value may be used.

Accordingly, application of the foregoing algorithm results in an identification in the following form: aaa.nnn.xxx.mmmm, where aaa is the Network Operator Identification, nnn is the Web Service Network Identification, xxx is the Entity Identification, and mmmm is the timestamp. However, any number of digits for each component of the entity identification may be employed.

F. Inter-Network Peering Service

In one embodiment, the Web services network platform includes inter-network peering functionality allowing disparate Web service networks to interoperate as if they had been merged. Such inter-network peering functionality allows for the creation of applications and composite Web services that are based on both a Web services network according to the present invention and other, disparate Web services networks. Specifically, such functionality facilitates the incorporation of such "externally networked" services into applications and composite Web services. The Web services network platform, in one embodiment, accomplishes this by identifying service requests that must be routed to externally networked services and by handling any handshake behaviors required to take into account the technological peculiarities of these external networks. This functionality is referred to as "forwarding," while the processing of routing the response back through the Web services network 40 to the requestor is referred to as "receiving." Examples of such external networks with which inter-network peering functionality may have to communicate include: Slam Dunk Networks, Flamenco Networks, Grand Central Networks, TransactPlus Networks, and CommerceQuest.

II. Operation

A. Routing of Service Operation Requests and Responses

The routing of service operation requests and responses, as well as distribution of topic messages, can rely on standard network protocols, such as SOAP, HTTP, XML and the like. A routing node (e.g., network services engine 54 or switch 56) receives a service operation request including a header identifying the source and an operation. The routing node scans its routing table for the computer network address associated with the operation. The routing node then opens an HTTP connection with the publisher system (e.g., server 24) corresponding to the computer network address and pushes the request to it. For synchronous service operation requests, the HTTP connection remains open until the publishing node responds or the request times out. For asynchronous requests, the HTTP connection is closed. The subscriber node issues a request to retrieve the response at a later time. Still further, for service operation requests designating a publisher beyond the firewall or domain associated with the network infrastructure, embodiments of the present invention open a secure communications path using standard techniques, such as Secure Sockets Layer, HTTPS or other suitable technologies. The routing of message topics occurs in a similar manner as described above. Furthermore, the publication of a message to a topic is performed, in one embodiment, by sending a service operation request to a routing node, which accesses its routing table for the information required to distribute the topic message.

A.1. Routing Entities and Routing Entries in Global Routing Table

As discussed above, the Web services network according to one embodiment operates in an environment including six routing entity types: 1) subscribers, 2) publishers, 3) services, 4) operations, 5) topics, and 6) end-users. As discussed above, the Web services network generates a unique routing entity identification for each routing entity as it is registered with the network (see above). In one embodiment, routing entity information is maintained in a database, such as a relational database system maintaining a plurality of tables corresponding to different entity types. This database, in one embodiment, is accessible to Web services network manager 90 to allow for creation and modification of routing entities, and to root network services engine 52 to allow for creation and modification of corresponding routing table entries in its global routing table and the local routing tables of its child nodes as described herein. In one embodiment, end-user routing entities are registered on the network in association with a set of profile values, including, for example, 1) an end-user routing entity identification; 2) a subscriber identification (the routing entity identification of the subscriber to which the user corresponds); 3) the user's name; and 4) the user's email address. The profile information associated with an end-user routing entity allows publishers to provide and customize services on a per end-user basis. Accordingly, the profile set can include any type of data deemed necessary by a publisher for a particular service and/or operation.

In one embodiment, the routing entity information discussed above is maintained in the global and local routing tables resident on network service engine 52, 54 or switch 56. A global or local routing table, in one embodiment, comprises one or more routing entries. To optimize the routing table lookups, information relating to routing entities are arranged as a series of routing table entries in a hash table or map wherein, in one embodiment, each routing entry includes information allowing for the routing of a service operation request involving a particular subscriber or distribution of a topic message involving a particular publisher. In one embodiment, each routing entry, in one embodiment, has two main components: a key and a value. Information concerning a particular routing entity can be culled from a given routing entry key-value pair and used to construct a new routing entry in the global and/or local routing tables. As one skilled in the art will recognize however the information in the global and local routing tables can be arranged in a variety of manners. For example, the global and local routing tables can maintain a plurality of data structures (e.g., relational tables) corresponding to each routing entity type.

As the following provides, routing information related to topics is arranged in a manner similar to routing information related to service operations. In one embodiment, the meaning and significance of the key and value components vary depending on whether the service corresponds to a Web service operation or a topic, as set forth below. For example, as the following exemplary routing table description illustrates, an operation is associated with a service identification and an operation identification, while a topic is represented merely by a unique service identification in the routing table where the corresponding operation identification is a null or dumby value. In one embodiment, the key comprises the following elements: 1) Network Operator ID, 2) Web Service Network ID, 3) Operation Name (the name of an operation; for a topic this may be a null or dumby value), 4) Service Name, and 5) Subscriber ID (a unique routing entity identification generated when the organization is registered on the network; for a service operation request, the Subscriber ID identifies the subscriber to an operation/service; in the context of a topic, this identifies the entity publishing messages to a topic). The value of a routing entry, in one embodiment, comprises the following elements: 1) operation_id (a unique routing entity identifier for an operation; note that with a topic, the operation_id, in one embodiment, is a null or "dumby" identifier); 2) an operation_type flag (indicating whether the operation type is internal or external; an internal operation type corresponds to an operation associated with a network platform service (e.g., routing entity request service, entity creator service, etc.), while an external operation type identifies an operation associated with a publisher); 3) one or more operation_urls (the URL where the published service/operations or subscribing endpoints are located; each URL may comprise a DNS hostname or an IP address and, optionally, a port number); 4) service_id (a unique routing entity identification corresponding to the service/topic associated with the operation); 5) service_type (indicates a 'legacy service' that is simply logged for reporting purposes or normal Web service); 6) publisher_id (a unique routing entity identification corresponding to the publisher of the service); 7) broadcast flag (when the flag is set, it generally indicates that the service is a topic and signals to the routing node that all identified operation_urls are to receive the message; otherwise, one operation_url is chosen from the list); and 8) is_valid_subscription (a Boolean value indicating whether the subscription associated with the subscriber_id is valid; for a topic this value indicates whether the publisher has privileges to publish messages to this topic). The value component may further include a pointer to the interface description associated with the web service allowing for retrieval of binding information to allow the switch 56 or engine 54 to mediate transport of the request. For example, a consuming application may compose a request identifying an operation and using a binding supported by switch 56. The switch 56 may then, using the pointer, retrieve the interface description stored by web services network manager 90, and transmit the request to the identified endpoint in the operation_url field using the binding specified in the interface description originally provided by the web services provider. This makes it possible to decouple invocation, transport, and binding in that service consumers will not be restricted to the transport bindings actually supported by the service implementation itself. Rather, the service consumers will be able to avail themselves of any transport supported by the mediation services that have been deployed onto that switch instance.

The key and value components of a routing entry may include a variety of different elements, relationships and associations to achieve various objectives. For example, the key may contain an end-user routing entity identification to allow for creation and enforcement of subscriptions or authorizations to publish to a topic at the end-user level. In one embodiment, an end-user name and a subscriber name, in combination, may map to an end-user routing entity identification in the global routing table. Still further, the routing tables may include a plurality of tables corresponding to the different routing entity types instead of the hash table format discussed above.

As discussed above, in one embodiment, a service operation request includes a header containing the key elements associated with a routing entry (in one embodiment: operation_name, service_name, and subscriber_id). In one embodiment, the service operation request header further includes a transaction identification used in connection with the transaction support services described above. Still further, a service operation request header may further include a message identification generated by a subscriber to facilitate handling of asynchronous service operation requests. Accordingly, when a publisher transmits a topic message, the corresponding header includes a null or dummy operation name, a service name corresponding to the topic and a publisher name.

For service operation requests (whether associated with a normal Web service or a topic), the routing nodes (e.g., engine 54 or switch 56) perform error checks on the service operation request. For example and in one embodiment, the routing node returns an error XML response, if 1) it cannot parse the XML request, 2) the request does not contain sufficient key information for a routing entry lookup, or 3) a key is invalid (e.g., a key value could not have been generated by the network). Assuming no such errors, if the subscription is valid, the routing node routes the request to the endpoint(s) identified in the request header by sending the XML service operation request using the operation_url value(s) associated with the routing entry. As discussed above, for a topic message, the broadcast flag is set to indicate to the routing node that the topic message should be sent to all endpoints associated with the topic. For a normal service operation, the broadcast flag is not set, indicating that the routing node should route the request to a single endpoint. In one embodiment, the routing node can send the request to the first identified endpoint, using the remaining endpoint(s) as failover nodes. In another embodiment, the routing node can arbitrate among the listed endpoints to perform a form of load balancing.

In embodiments incorporating the instancing functionality discussed above, the routing node determines whether the request generally identifies a service and/or operation or a specific version/instance of a service. As discussed above, for generalized requests, the routing node, by default, uses the latest version information associated with the web service in its routing tables to route the service operation request.

For a service operation, the publisher of the service at the operation_url processes the request, executes the corresponding operation, and returns a response to the routing node. The routing node then returns the response to the subscriber system that originated the request. If the subscription is not valid, the routing node returns an XML error message indicating that no subscription exists for the service. For a topic message, the topic listener associated with the endpoint receives the request and, in one embodiment, transmits an acknowledgement packet or message to the routing node.

FIG. 7A illustrates data flows corresponding to four possible scenarios involving the routing of service operation requests and responses according to an embodiment of the present invention. In a first scenario, a subscriber node 42 transmits a service operation request to network services switch 56 (FIG. 5, 1a). Network services switch 56 processes the header associated with the request, transmits it to the publisher node 44 designated in the header (1b), and logs the service operation request. Subsequently, publisher node 44 receives the service operation request, generates a service operation response (in one embodiment, the response is an XML response), and transmits it over the Web services network. Network services switch 56 receives the service operation response, processes the header appended to the response, logs it, and transmits it to the subscriber node 42 designated in the header. In a second scenario, subscriber node 42 transmits a service operation request directly to network services engine 54 (3*a*), which routes the request to the publisher node designated in the header appended to the request (3*b*).

Other scenarios are also possible. For example, in a third scenario, subscriber node 42 transmits a service operation request to network services engine 54 (2*a*), which routes the request to the publisher node 44 identified in the header associated with the request (2*b*). Publisher node 44, however, fails to process the request; after the response has timed out, network services engine 54 transmits the service operation request to an alternate or fail over publisher node 44 for processing (2*c*). In addition, the network services engine may choose to fail over to an alternative transport that offers a higher degree of reliability—perhaps JMS instead of HTTP, for example. This is made possible due to the fact that invocation bindings are de-coupled from endpoint bindings due to the transport mediation aspect of the virtualization functionality according to the present invention. Lastly, in a fourth scenario, subscriber node 42 transmits a composite service operation request for processing to network services switch 56 (4*a*). Network services switch 56 routes the composite request to publisher node 45 (4*b*), which process the composite request and issues service operation requests via network services switch 56 to the appropriate publisher nodes 44 (4*c*, 4*d*1, 4*d*2). Publisher nodes 44 process the requests and respond to publisher node 45, which constructs a composite service operation response.

FIG. 7B illustrates two scenarios involving the routing of message topics in the Web services network architecture according to an embodiment of the present invention. Assuming that one or more subscribers 42 have configured a subscription to a given topic and implemented a topic message processor (e.g., topic listener 43), publisher 44 publishes a message to a given topic, in one embodiment, by dispatching a SOAP message to a Web services routing node. As FIG. 7B illustrates, publisher 44 can transmit the topic message to a Web services network engine 54 (1) or a Web services network switch 56 (2). As discussed above, the header information in the topic message includes a service ID identifying a topic, the routing node (engine 54 or switch 56) consults its routing table for a routing entry and distributes the topic message to the subscribers 44 associated with the topic. In one embodiment, the Web services routing node opens an HTTP connection with the topic listener 43, transmits the topic message and closes the HTTP connection.

B. Routing Table Maintenance

Embodiments of the present invention further include protocols and functionality to efficiently enable and support the distributed network architecture described herein.

B.1. Routing Entry Requests

As discussed above, new routing table entries are added to local routing tables on demand. When a routing fault occurs at a routing node, that routing node utilizes a routing entry query service available on a parent network routing service engine to update its routing table and add the missing entry. In one embodiment, the routing entity request service has an operation corresponding to different routing entity types (e.g., publisher, subscriber, service, operation, end-user, topic, etc.). The purpose of each operation is to provide all data relevant to an entity of that type. In one embodiment, routing entity requests are XML requests transmitted to the parent node. If the parent node lacks the required routing table entry, it passes on the same service operation request it received from its child node.

FIG. 8 illustrates the process flow associated with a routing entry request. As discussed above, a routing node that receives a service operation request including a routing entity not contained in its local routing table obtains the requisite routing table entry from a parent node. In one embodiment, subscriber node 44 [Subscriber 3] transmits a service operation request to network service switch 56 (FIG. 8, #1). The header appended to the request contains an identifier for Subscriber 3, the source of the request. Because the local routing table residing on network service switch 56, however, does not contain a routing table entry for Subscriber 3, switch 56 experiences a routing fault when it attempts to process the request. When this occurs, switch 56 composes a routing entry request to its parent engine node 54 (FIG. 8, #2). In one embodiment, the routing entry request is a "Get Subscriber" operation within the "Routing Entity Query" service available on parent engine node 54.

In this example, parent engine node 54 has similarly never been tasked to route requests involving Subscriber 3 and Subscriber 3 was not added at this particular engine node. Accordingly, it also lacks the information on this routing entity, and must forward the "Get Subscriber" request to its own parent node—in this case, root engine node 52 (FIG. 8, #3). Because root engine node 52 maintains a global routing table, it is able to fulfill the request, assuming a routing table entry exists at all. The requesting node(s) processes the resulting service response to the routing entry request, using the encapsulated data to update its local routing table. Network services switch 56 may then process the service operation request.

B.2. Introduction of New Routing Table Entries

When a new routing table entity (Subscriber, Publisher, Service, Operation, or End-User) is added to Web services network 40, a routing table entry is created in the global routing table on root engine node 52. In one embodiment, new routing table entries are added through any non-root engine node in the network. In other embodiments, new routing table entries may be added directly to the global routing table of root engine node 52. As discussed more fully below, new routing table entries are entered into the local routing table of a network services engine 54, and then distributed to other local routing tables of parent nodes continuing up to root engine node 52.

In one embodiment, the creation and configuration of a routing entity is implemented by a Web service. In one embodiment, the routing entity creator service includes operations corresponding to the different routing entity types supported by the network. For instance, adding a new publisher can be accomplished by composing a request to the "Add Publisher" operation of the routing entity creator service and submitting that request to any non-root node in the network. As discussed above, Web services network manager 90 includes functionality facilitating the generation of such requests. A network services engine 54 that receives a routing entity creator operation request fulfills the request by making the required insertions into its routing table database and then forwarding the request to its parent node. The parent node then forwards this request to its parent, and so on until all of the node's direct ancestors, including the root node, have had the new entry added to their respective routing tables. Once this process is complete, the new entry is considered to have been added to the global routing table.

As discussed above, adding a routing entity to a network, in one embodiment, involves generating an identification that will be used to identify that entity as represented in the routing entries of the global routing table. In one form, root engine node 52 has sole responsibility for generating routing table entry identifications, although new entities may be added at any non-leaf engine node 54. Accordingly, as part of the process of serving a request to add a routing table entity, an instance of network services engine 54 makes a request to the root engine node 52 in order to obtain a routing entry identification for the new routing entity. In one embodiment, generation of routing entity identifications is a Web service available on root engine node 52 and includes an operation allowing for the generation of unique identifications.

FIG. 10 illustrates the addition of a routing entity into Web services network 40 according to one embodiment of the present invention. A network administrator 74, for example, accesses Web services network manager 90 to add a new publisher to the network (FIG. 10, #1). Web services network manager 90 composes a "Add New Publisher" operation request and transmits it to network services engine 54 (FIG. 10, #2). Network services engine 54 responds to the request by issuing a generate identification operation request to root engine 52 to provide a new publisher identification (FIG. 10, #3). After root engine 52 generates a publisher identification and responds to the request, network services engine 54 updates its local routing table and transmits an "Add New Publisher" request to its parent node (FIG. 10, #4). This request is processed at each node and propagates up the tree structure until it is received by root engine node 52, which updates the global routing table. Note that network services switch 56 plays no role in this process. Its local routing table will not be updated to include the new publisher until it issues a routing entity request in response to a service operation request involving the new publisher. In an alternative embodiment, web services network manager 90 can add routing entities directly to the database associated with root network services engine 52.

Similarly, as discussed above, web services network manager 90, in one embodiment, can use the functionality of web services network 40 to create appropriate service and operation routing entities in response to the registration of a given web service. For example, registration of the StockQuote service, as defined in the interface description provided above, necessitates creation of a StockQuote service routing entity and a GetTradePrice operation routing entity. In one embodiment, the StockQuote service entity includes the following elements: 1) a service name (StockQuote), 2) one or more operations (here, GetTradePrice), and 3) an access control list. The GetTradePrice Operation entity includes the following elements: 1) an operation identifier (here, GetTradePrice), 2) a service identifier (here, StockQuote), 3) one or more endpoint locations (operation_uris) associated with the operation (here, http://example.com/stockquote/). Of course, other arrangements for the data elements are possible. For example, the endpoint locations may be associated with the entity as opposed to operation entities. In one embodiment, web services network manager 90 can create such entities by transmitting them to the database that maintains routing entities associated with the web services network 40. In one embodiment, root network services engine 52 will ultimately access information concerning these routing entities in response to a routing entity request issued by a child routing node. In another embodiment involving the use of unique network identifications, web services network manager 90 can use the routing entity creator service discussed above.

B.3. Updates to and Maintenance of Routing Table Entries

Just as routing table entry acquisition, above, relies on a service, maintenance of routing table data associated with a Web services network relies on a similar service available on network services engine 52 or 54. A distinction is the direction taken by such service operation requests. In the case of routing table entry acquisition, routing entry requests flow exclusively from child nodes to parent nodes. In the case of routing table entry maintenance, however, routing maintenance requests also flow from parent nodes to child nodes. In one embodiment, network services engine 52, 54 support a routing entry updater service having operations corresponding to each of the routing entity types discussed above. Each operation is responsible for handling updates for a corresponding entity type. In order to provide a child node with routing table entry updates, its parent will simply invoke this service, generating an operation request corresponding to the type of entity for which it is providing an update.

FIG. 9 illustrates a use case where an administrator 74 accesses Web services network manager 90 to update routing or related data associated with a routing entity (FIG. 9, #1). For instance, if a subscriber is provided with permission to access a newly offered Web service, the data describing those permissions must be available to every node on the network. In addition, changes to endpoint locations corresponding to a given service also require that data concerning the new endpoint locations be made available to the routing nodes of the network. Still further, the registration of a new version of an existing web service under the instancing functionality, according to embodiments of the present invention, requires that the routing information associated with the new version be made available to the routing nodes of the network. Management application 90 generates a request for a routing table change and transmits it to network services engine 54 (FIG. 9, #2). Network services engine 54 receives the request, updates its local routing table and passes the update request on to its parent node (here, root engine node 52) and its child network services switch 56 (FIG. 9, #3*a*, 3*b*). As FIG. 9 shows, the routing entry update request propagates up to root engine node 52, which updates the global routing table.

Subsequent updating of the local routing tables of other routing nodes in other branches of the tree structure occur during routine routing table maintenance performed by non-leaf network services engines 52, 54. Upon initialization and periodically in a background process, non-leaf network services engines 52, 54 monitor the status of their own respective local routing tables, as well as the local routing tables of their respective child nodes. Whenever a network services engine 54 discovers a routing table entry that is out of date, it will generate a Routing Table Updater service operation request and submit that request to the appropriate child node.

In one embodiment, the data required by the parent routing node to make determinations as to what entities in which children's routing tables need updating is maintained in a routing matrix data structure. A routing matrix is a two-dimensional construct that contains one column for each of the routing node's children (along with a column for it) and one row for each routing entry in the node's local routing table. FIG. 12 sets forth a routing matrix for didactic purposes. If a parent routing node has an entry in its routing table for a Publisher X and children A and B, this will account for three entries in the routing matrix—a row for Publisher X that intersects with a column for the parent nodes routing table and one column for each of the two children.

Each cell in the routing matrix contains an update stamp that represents the last time a routing entry was updated. Continuing with the example of FIG. 12, if the routing matrix entry in row "Publisher X" and column "Child Node B" is "1/4/03; 16:15" then the last time child node B's routing entry for Publisher X was updated was Jan. 4, 2003 at 4:15 p.m. Note that because child nodes possess only a subset of the entries in their parent's local routing table, some entries in the matrix will be empty. The "local routing table" column contains the update stamps that refer to the routing table entries in the parent node's local routing table. By comparing local routing table stamps to those in the child columns, the background process determines what routing table update requests it should compose and when. Each time the process encounters an update stamp in a child column that is earlier than the dirty update stamp in the same row, that process will spawn a thread that generates an update request and submits that request to the appropriate child.

In the example matrix provided by FIG. 12, update stamp values are denoted as date; time, with seconds omitted. Out of date entries are marked with shaded columns. On its next pass through the table, the background process executed by network services engine 52 or 54 responsible for keeping child nodes up to date will address the two out of date entries shown. Specifically, it will generate a request to Child B containing updated information on Subscriber X and a request to Child A with updated information on Operation X.

In one embodiment, certain protocols and rules are implemented to adequately maintain the routing matrices and routing table data across the network. In one embodiment, when the child node updating process initializes, the process creates a routing matrix including "local routing table" update stamps from the local routing table of the network services engine and sets update stamp values in the cells of the child columns to "0/0/00" (zero date). Consequently, these zero dates generate the transmission of a large number of update requests to corresponding child nodes. Each time an update request is sent to a child node, the parent node enters the appropriate update stamp the current time in its routing matrix. So, if child B is sent an update request providing it with the latest information on Publisher X, the matrix entry in child B's column and Publisher X's row should then equal the time at which the update occurred.

In addition, when a new entry is made in the local routing table of the parent node, a corresponding row must be added to its routing matrix. The update stamp for the "local routing table" column is set to the current time and the matrix cell entries in the child columns are set to null. Similarly, when a child node is initialized it sends a message to its parent node indicating that it has come online. The parent node responds to this message by adding a column to its routing matrix (if one does not already exist for that child node) and setting all of the entries in that column to "empty."

When a parent node receives a Routing Entity Query request, indicating one of its children has experienced a routing fault, the parent node, as discussed above, attempts to serve that request and then, if the request was served successfully (indicated by an acknowledgement message), update the appropriate entry in its routing matrix to the then-current time. When a Routing Table Updater request is received by a parent node, indicating that its parent is passing along updated routing table information, the node should service the request by updating the appropriate routing table entries and then setting the "local routing table" update stamps for those entries to the then-current time.

C. Event Logging

In some embodiments, in the course of processing a service operation request, information is extracted from that request and logged in a persistent store. For an instance of the network services engine 54, logging information, in one embodiment, is collected and stored in its associated database 62. To reduce the resources required to execute network services switch 56, logging functionality is offloaded to an instance of network services engine 54. Specifically, instead of interacting with a database, network services switch 56 encapsulates log data in a logging service operation request or reporting token that is sent to a network services engine 54. Specifically, and in one embodiment, when a routing node processes a service request it (1) performs security checks, (2) passes a reporting token to a logging node, and (3) routes the request. Accordingly, the routing node does not actual log any information; rather, it delegates that duty to a separate node, preventing network services switch 56 and potentially other routing nodes from being impacted by the demands associated with persisting log data. The recipient network services engine 54 services the request or token by inserting the required data into the database. The logging of routing node errors, such as a routing fault, can be logged in the same manner. Furthermore, as FIG. 5 shows, some embodiments of Web services network 40 include reporting node 58 dedicated to receiving and processing reporting tokens from network services switches 56 and network services engines 54. In one embodiment, all routing nodes (e.g., network services engines 54 and/or switches 56) transmit logging service operation requests to reporting node 58.

Lastly, although the present invention has been described as operating in connection with end systems employing XML, SOAP, HTTP, TCP and IP protocols, the present invention has application in computer network environments employing any suitable Web services networking, session layer, transport layer and network layer protocols. In addition, while the embodiments described above operated on interface descriptions consistent with the WSDL format and discovery mechanisms, the present invention can be applied to a variety of interface description formats and discovery mechanisms, such as IDL, MIDL, WS-Inspection, DISCO, and UDDI, and more broadly based protocols such as WS-Policy. Moreover, while embodiments of the present invention have primarily been described as operating in connection with Web services network engines and switches in a distributed Web services network architecture, as discussed above, the virtualization, dynamic provisioning and instancing functionality can be incorporated into a variety of Web services network architectures including peer-to-peer architectures and architectures involving Web services network brokers and/or gateways. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method for dynamic provisioning of web services, comprising receiving, at a computing device, an interface description document associated with a web service;

identifying one or more operations supported by the web service;

creating by the computing device, for one or more identified operations, routing entity information for routing service operation requests associated with the web service;

configuring one or more routing nodes of a web services network infrastructure with the routing entity information created for the one or more identified operations;

modifying the interface description document to replace, for one or more identified operations, endpoint location information corresponding to the one or more identified operations in the interface description document with location information of a first routing node of the one or more routing nodes of the web services network infrastructure; and transmitting the modified interface description document in response to a request for the interface description document.

2. The method of claim 1 further comprising
identifying mutable elements in the interface description document; and
replacing at least one mutable element in the interface description document with information reflecting a current state of the one or more routing nodes of the web services network infrastructure.

3. The method of claim 1 wherein the routing entity information for the one or more identified operations includes unique operation identifiers corresponding to respective identified operations supported by the web service, and wherein the unique operation identifiers map to binding information associated with the web service.

4. The method of claim 1 wherein the interface description document includes a first binding defining the endpoint location and protocols for accessing the web service;
wherein the web services network infrastructure supports a second binding type; and
wherein the method further comprises:
replacing the first binding in the interface description document with a second binding defining the endpoint location of a routing node within the web services network infrastructure and the protocols for accessing the routing functionality of the routing node.

5. The method of claim 4 wherein the first binding is a SOAP binding.

6. The method of claim 5 wherein the second binding is a SOAP binding identifying a routing node associated with the web services network infrastructure and a web service operation.

7. The method of claim 1 wherein the interface description document is a Web Services Definition Language (WSDL) document.

8. The method of claim 1 wherein the location information of the first routing node comprises an IP address of the routing node in an encoded URL that further includes an operation identifier that maps to an identified operation of the web service.

9. A method comprising:
receiving, at a computing device, an interface description document associated with a web service, wherein the interface description document describes an operation and an endpoint location;
modifying the interface description document by replacing the endpoint location with location information of a web services network routing node;
associating a web service operation identifier with the operation in the interface description document;
adding a routing entry to a web services network directory including the web service operation identifier and the endpoint location associated with the web service; and
transmitting the modified interface description document in response to a request for the interface description document.

10. The method of claim 9 wherein the interface description document is a WSDL document.

11. The method of claim 9 wherein the location information of the web services network routing node comprises an IP address of the web services network routing node in an encoded URL that further includes the web service operation identifier that maps to the operation included in the interface description document.

12. The method of claim 9, further comprising:
identifying mutable elements in the interface description document; and
replacing at least one mutable element in the interface description document with information reflecting a current state of one or more routing nodes of a web services network infrastructure.

13. The method of claim 9 wherein the unique operation identifier maps to binding information associated with the web service.

14. The method of claim 9 wherein the interface description document includes a first binding defining the endpoint location and protocols for accessing the web service,
wherein the web services network infrastructure supports a second binding type, and
wherein the method further comprises replacing the first binding in the interface description document with a second binding defining the endpoint location of the web services network routing node and protocols for accessing the routing functionality of the routing node.

15. A system, comprising
a web services network management platform, having one or more processors, operative to:
receive, at a computing device, an interface description document associated with a web service;
identify one or more operations supported by the web service;
create by the computing device, for one or more identified operations, routing entity information for routing service operation requests associated with the web service;
add the routing entity information to a web services network directory;
modify the interface description document to replace, for one or more identified operations, endpoint location information corresponding to the one or more identified operations in the received interface description document with location information of a first routing node of the one or more routing nodes of the web services network infrastructure; and
transmit the modified interface description document in response to a request for the interface description document; and
one or more routing nodes, each operative to:
receive a request including a web service operation identifier;
access the web services network directory to locate information associated with the web service operation identifier; and
route the request using location information stored in the web services network directory.

16. The system of claim 15 wherein the location information of the first routing node comprises an IP address of the routing node in an encoded URL that further includes an operation identifier that maps to an identified operation of the web service.

17. The system of claim 15 wherein the routing entity information for the one or more identified operations includes unique operation identifiers corresponding to respective identified operations supported by the web service, and wherein the unique operation identifiers map to binding information associated with the web service.

18. The system of claim 15, wherein the web services network management platform is further operative to:
  identify mutable elements in the interface description document; and
  replace at least one mutable element in the interface description document with information reflecting a current state of one or more routing nodes of a web services network infrastructure.

19. The system of claim 15, wherein the unique operation identifier maps to binding information associated with the web service.

20. The system of claim 15, wherein the interface description document includes a first binding defining the endpoint location and protocols for accessing the web service,
  wherein the web services network infrastructure supports a second binding type, and
  wherein the method further comprises replacing the first binding in the interface description document with a second binding defining the endpoint location of the web services network routing node and protocols for accessing the routing functionality of the routing node.

* * * * *